United States Patent
Henderson et al.

(10) Patent No.: US 9,157,566 B2
(45) Date of Patent: Oct. 13, 2015

(54) INSULATION SYSTEMS EMPLOYING EXPANSION FEATURES TO INSULATE ELONGATED CONTAINERS SUBJECT TO EXTREME TEMPERATURE FLUCTUATIONS, AND RELATED COMPONENTS AND METHODS

(71) Applicants: Randal Lee Henderson, Zebulon, NC (US); Douglas M. Stolpe, Wake Forest, NC (US); Joseph Robert Secoura, Wake Forest, NC (US)

(72) Inventors: Randal Lee Henderson, Zebulon, NC (US); Douglas M. Stolpe, Wake Forest, NC (US); Joseph Robert Secoura, Wake Forest, NC (US)

(73) Assignee: NOMACO INC., Zebulon, NC (US)

( * ) Notice: Subject to any disclaimer, the term of this patent is extended or adjusted under 35 U.S.C. 154(b) by 194 days.

(21) Appl. No.: 13/892,614

(22) Filed: May 13, 2013

(65) Prior Publication Data
US 2014/0023809 A1  Jan. 23, 2014

Related U.S. Application Data

(60) Provisional application No. 61/646,049, filed on May 11, 2012.

(51) Int. Cl.
*F16L 59/02* (2006.01)
*F16L 59/21* (2006.01)
*B29C 47/00* (2006.01)

(52) U.S. Cl.
CPC ........... *F16L 59/027* (2013.01); *B29C 47/0042* (2013.01); *B29C 47/0064* (2013.01);
(Continued)

(58) Field of Classification Search
CPC ....... F16L 59/027; F16L 59/02; F16L 59/022; F16L 59/21; B29C 47/004; B29C 47/0066; B29C 47/00; B29C 47/0064; B29C 47/0042; Y10T 428/1355; Y10T 428/1376
USPC ................................. 428/35.8, 36.5; 264/145
See application file for complete search history.

(56) References Cited

U.S. PATENT DOCUMENTS

| 1,162,543 | A | 11/1915 | Anderson |
| 1,478,891 | A | 12/1923 | Combs |

(Continued)

FOREIGN PATENT DOCUMENTS

| CN | 2137475 Y | 7/1993 |
| CN | 2302709 Y | 1/1999 |

(Continued)

OTHER PUBLICATIONS

Extended European Search Report for patent application 07862201 mailed Aug. 17, 2010, 9 pages.

(Continued)

*Primary Examiner* — Michael C Miggins
(74) *Attorney, Agent, or Firm* — Withrow & Terranova, PLLC

(57) ABSTRACT

Insulation systems employing expansion features to insulate elongated containers subject to extreme temperature fluctuations, and related components and methods are disclosed. Elongated containers, such as pipes, tanks, vessels may have contents that need to be insulated to prevent heat exchange with the outside environment. Insulation systems are disposed along the perimeter of the elongated containers to prevent the heat exchange. In cases where the insulation systems are subject to extreme temperature fluctuations, components of the insulation may thermally expand and/or contract, and may form gaps between the components. Alternatively, damaging stresses may be formed as the thermal dimensional changes may be restricted as part of the installation. The insulation system comprises expansion features to better enable the gaps to be filled and relieve damaging stresses. In this manner, the elongated containers may be efficiently insulated even while subjected to extreme temperature fluctuations.

37 Claims, 27 Drawing Sheets

(52) U.S. Cl.
CPC ........... *B29C47/0066* (2013.01); *F16L 59/022* (2013.01); *F16L 59/21* (2013.01); *B29C 47/004* (2013.01); *Y10T 428/1355* (2015.01); *Y10T 428/1376* (2015.01)

(56) References Cited

U.S. PATENT DOCUMENTS

| | | | |
|---|---|---|---|
| 1,734,209 A | 11/1929 | Huffine | |
| 1,930,285 A | 10/1933 | Robinson | |
| 2,241,644 A | 5/1941 | Nichols et al. | |
| 2,369,000 A | 2/1945 | Page | |
| 2,717,848 A | 9/1955 | Jaye | |
| 2,748,805 A | 6/1956 | Winstead | |
| 2,835,313 A | 5/1958 | Dodge | |
| 2,955,056 A | 10/1960 | Knox | |
| 3,117,902 A | 1/1964 | Holzheimer | |
| 3,159,515 A | 12/1964 | Dunlap, Jr. et al. | |
| 3,191,632 A | 6/1965 | Keiding | |
| 3,195,184 A | 7/1965 | Svec | |
| 3,251,382 A | 5/1966 | Tatsch | |
| 3,257,228 A | 6/1966 | Reed | |
| 3,388,017 A | 6/1968 | Grimsley et al. | |
| 3,531,552 A | 9/1970 | Getz et al. | |
| 3,554,835 A | 1/1971 | Morgan | |
| 3,557,840 A | 1/1971 | Maybee | |
| 3,575,769 A | 4/1971 | Radzio | |
| 3,594,028 A | 7/1971 | Scott | |
| 3,691,990 A | 9/1972 | McCabe | |
| 3,700,520 A | 10/1972 | Hielema | |
| 3,758,362 A | 9/1973 | Brown | |
| 3,777,632 A | 12/1973 | Pepmeier | |
| 3,782,994 A | 1/1974 | Doherty | |
| 3,804,438 A | 4/1974 | Humphries et al. | |
| 3,821,939 A | 7/1974 | Doherty | |
| 3,829,340 A | 8/1974 | Dembiak et al. | |
| 3,877,139 A | 4/1975 | Martinez | |
| 3,916,953 A | 11/1975 | Nagayoshi et al. | |
| 3,950,213 A | 4/1976 | Rejeski et al. | |
| 4,022,248 A | 5/1977 | Hepner et al. | |
| 4,035,211 A | 7/1977 | Bill et al. | |
| 4,036,617 A | 7/1977 | Leonard et al. | |
| 4,106,139 A | 8/1978 | Southard | |
| 4,110,857 A | 9/1978 | Banister | |
| 4,134,166 A | 1/1979 | Schuder | |
| 4,143,435 A | 3/1979 | Masuda | |
| 4,146,562 A | 3/1979 | Fukushima et al. | |
| 4,157,410 A | 6/1979 | McClintock | |
| 4,159,355 A | 6/1979 | Kaufman | |
| 4,214,612 A | 7/1980 | De Putter | |
| 4,218,814 A | 8/1980 | Hodapp | |
| 4,243,453 A | 1/1981 | McClintock | |
| 4,247,583 A | 1/1981 | Roy | |
| 4,287,245 A | 9/1981 | Kikuchi | |
| 4,348,243 A | 9/1982 | Craubner | |
| 4,389,270 A | 6/1983 | McClintock | |
| 4,393,116 A | 7/1983 | Taylor | |
| 4,397,053 A | 8/1983 | Fanti | |
| 4,413,656 A | 11/1983 | Pithouse | |
| 4,419,158 A | 12/1983 | Osterhagen et al. | |
| 4,432,110 A | 2/1984 | Sutton | |
| 4,446,181 A | 5/1984 | Wood | |
| 4,478,670 A | 10/1984 | Heyse et al. | |
| 4,524,473 A | 6/1985 | Fanti | |
| 4,576,206 A | 3/1986 | Lauren | |
| 4,584,217 A | 4/1986 | McClintock | |
| 4,595,615 A | 6/1986 | Cohen | |
| 4,603,445 A | 8/1986 | Spann | |
| 4,606,957 A | 8/1986 | Cohen | |
| 4,618,517 A | 10/1986 | Simko, Jr. | |
| 4,620,337 A | 11/1986 | Williams et al. | |
| 4,687,530 A | 8/1987 | Berscheid et al. | |
| 4,690,668 A | 9/1987 | Rebmann et al. | |
| 4,700,447 A | 10/1987 | Spann | |
| 4,713,271 A | 12/1987 | Searl et al. | |
| 4,713,854 A | 12/1987 | Graebe | |
| 4,741,058 A | 5/1988 | Williams et al. | |
| 4,748,060 A | 5/1988 | Fry et al. | |
| 4,755,408 A | 7/1988 | Noel | |
| 4,767,653 A | 8/1988 | Renstrom | |
| 4,772,507 A | 9/1988 | Leo, Jr. et al. | |
| 4,778,700 A | 10/1988 | Pereira | |
| 4,778,703 A | 10/1988 | Fontanilla | |
| 4,780,347 A | 10/1988 | Cohen | |
| 4,781,033 A | 11/1988 | Steyert et al. | |
| 4,796,316 A | 1/1989 | Boselli | |
| 4,837,060 A | 6/1989 | Bambara et al. | |
| 4,838,968 A | 6/1989 | Nelson | |
| 4,842,908 A | 6/1989 | Cohen et al. | |
| 4,851,383 A | 7/1989 | Fickenscher et al. | |
| 4,857,371 A | 8/1989 | McClintock | |
| 4,879,776 A | 11/1989 | Farley | |
| 4,900,596 A | 2/1990 | Peacock | |
| 4,909,883 A | 3/1990 | Adell | |
| 4,924,679 A | 5/1990 | Brigham et al. | |
| 4,935,300 A | 6/1990 | Parker et al. | |
| 4,937,111 A | 6/1990 | Fontanilla | |
| 4,946,732 A | 8/1990 | Cohen et al. | |
| 4,952,450 A | 8/1990 | Noel | |
| 4,954,202 A | 9/1990 | Price et al. | |
| 4,955,096 A | 9/1990 | Gilroy et al. | |
| 4,972,535 A | 11/1990 | Goldman et al. | |
| 5,022,111 A | 6/1991 | Fenner, Sr. | |
| 5,031,375 A | 7/1991 | Martinez | |
| 5,038,433 A | 8/1991 | Farley | |
| 5,069,969 A | 12/1991 | McClintock et al. | |
| 5,070,560 A | 12/1991 | Wilkinson | |
| 5,070,597 A | 12/1991 | Holt et al. | |
| 5,083,335 A | 1/1992 | Krouskop et al. | |
| 5,104,701 A | 4/1992 | Cohen et al. | |
| 5,118,555 A | 6/1992 | Horovitz | |
| 5,123,453 A | 6/1992 | Robbins | |
| 5,136,740 A | 8/1992 | Kraft | |
| 5,138,730 A | 8/1992 | Masuda | |
| 5,141,793 A | 8/1992 | Fontanilla | |
| 5,234,520 A | 8/1993 | McClintock | |
| 5,274,846 A | 1/1994 | Kolsky | |
| 5,281,456 A | 1/1994 | Botsolas | |
| 5,294,470 A | 3/1994 | Ewan | |
| 5,310,594 A | 5/1994 | Holland et al. | |
| 5,327,597 A | 7/1994 | Rothbard | |
| 5,343,738 A | 9/1994 | Skaggs | |
| 5,389,317 A | 2/1995 | Grimmer | |
| 5,411,777 A | 5/1995 | Steele et al. | |
| 5,415,822 A | 5/1995 | Cook | |
| 5,419,859 A | 5/1995 | Hartman et al. | |
| 5,421,371 A | 6/1995 | Lauer | |
| 5,451,451 A | 9/1995 | Minnick | |
| 5,472,154 A | 12/1995 | Qiu et al. | |
| 5,488,746 A | 2/1996 | Hudson | |
| 5,491,852 A | 2/1996 | Maucher | |
| 5,492,662 A | 2/1996 | Kargol et al. | |
| 5,494,627 A | 2/1996 | Kargol et al. | |
| 5,605,593 A | 2/1997 | Lauer | |
| 5,643,139 A | 7/1997 | Stout et al. | |
| 5,660,903 A | 8/1997 | Andersen et al. | |
| 5,725,723 A | 3/1998 | Cusick et al. | |
| 5,924,531 A | 7/1999 | Stark et al. | |
| 5,953,818 A | 9/1999 | Matthews et al. | |
| 5,987,668 A | 11/1999 | Ackley | |
| 6,000,420 A | 12/1999 | Nicholson et al. | |
| 6,112,770 A | 9/2000 | Walsh et al. | |
| 6,262,137 B1 | 7/2001 | Kozma et al. | |
| 6,284,346 B1 | 9/2001 | Sheridan | |
| 6,306,235 B1 | 10/2001 | Henderson | |
| 6,323,251 B1 | 11/2001 | Perez et al. | |
| 6,328,346 B1 | 12/2001 | Masters et al. | |
| 6,403,182 B1 | 6/2002 | Plummer et al. | |
| 6,425,153 B1 | 7/2002 | Reswick | |
| 6,537,405 B1 | 3/2003 | Henderson et al. | |
| 6,851,643 B2 | 2/2005 | Qiu et al. | |
| 6,866,915 B2 | 3/2005 | Landvik | |
| 7,093,619 B2 | 8/2006 | Watanabe et al. | |
| 7,159,620 B2 | 1/2007 | Kissell | |
| 7,393,577 B2 | 7/2008 | Day et al. | |

(56) References Cited

U.S. PATENT DOCUMENTS

| | | |
|---|---|---|
| 7,426,767 B2 | 9/2008 | Mossbeck |
| 7,975,728 B2 | 7/2011 | Melville et al. |
| 8,006,360 B2 | 8/2011 | Richmond et al. |
| 8,261,558 B2 | 9/2012 | Cao et al. |
| 8,658,264 B2 | 2/2014 | Cao et al. |
| 2002/0054996 A1 | 5/2002 | Rheenen |
| 2002/0100517 A1 | 8/2002 | Somerville et al. |
| 2003/0082343 A1 | 5/2003 | Brucker |
| 2005/0011569 A1 | 1/2005 | Della Putta et al. |
| 2006/0127648 A1 | 6/2006 | De Luca |
| 2006/0194892 A1 | 8/2006 | Ramesh et al. |
| 2007/0017590 A1 | 1/2007 | Tigerfeldt |
| 2007/0044906 A1 | 3/2007 | Park |
| 2008/0128043 A1 | 6/2008 | Watkins |
| 2008/0138553 A1 | 6/2008 | Lauer et al. |
| 2010/0030316 A1 | 2/2010 | Prindle et al. |
| 2010/0047550 A1 | 2/2010 | Prissok et al. |
| 2010/0223732 A1 | 9/2010 | Allman et al. |
| 2010/0330316 A1 | 12/2010 | Cao et al. |
| 2011/0030833 A1 | 2/2011 | Griggio |

FOREIGN PATENT DOCUMENTS

| | | |
|---|---|---|
| CN | 1233444 A | 11/1999 |
| CN | 1275945 A | 12/2000 |
| CN | 2432041 Y | 5/2001 |
| CN | 1744986 A | 3/2006 |
| CN | 2841067 Y | 11/2006 |
| DE | 1162543 B | 2/1964 |
| DE | 2509833 A1 | 9/1976 |
| EP | 0046080 A2 | 2/1982 |
| EP | 1232849 A2 | 8/2002 |
| GB | 1478891 A | 7/1977 |
| GB | 1514369 A | 6/1978 |
| GB | 2318531 A | 4/1998 |
| JP | 5129549 U | 8/1976 |
| JP | 2000170992 A | 6/2000 |
| WO | 9514136 A1 | 5/1995 |
| WO | 9522922 A1 | 8/1995 |
| WO | 02075203 A1 | 9/2002 |
| WO | 02077513 A1 | 10/2002 |
| WO | 2004041659 A2 | 5/2004 |
| WO | 2008006768 A1 | 1/2008 |
| WO | 2009014657 A1 | 1/2009 |

OTHER PUBLICATIONS

International Search Report for PCT/US2007024341 mailed Apr. 29, 2008, 8 pages.
Preliminary Report on patentability for PCT/US2007/024341 mailed Jan. 6, 2009, 7 pages.
Preliminary Report on patentability for PCT/US2010/040003 mailed Jan. 12, 2012, 9 pages.
International Search Report for PCT/US2010/040003 mailed Aug. 30, 2010, 10 pages.
Notice of Allowance for U.S. Appl. No. 08/395,758 mailed Jul. 23, 1996, 3 pages.
Non-final Office Action for U.S. Appl. No. 08/047,487 mailed Aug. 5, 1994, 11 pages.
Non-final Office Action for U.S. Appl. No. 11/986,619 mailed Mar. 7, 2011, 7 pages.
Final Office Action for U.S. Appl. No. 11/986,619 mailed Dec. 22, 2010, 7 pages.
Non-final Office Action for U.S. Appl. No. 11/986,619 mailed Jun. 23, 2010, 5 pages.
First Chinese Office Action for patent application 200780043850 mailed Aug. 17, 2011, 8 pages.
Japanese Office Action for patent application 2009539273 mailed Jul. 10, 2012, 6 pages.
Non-final Office Action for U.S. Appl. No. 13/567,168 mailed Oct. 22, 2012, 8 pages.
International Search Report and Written Opinion for PCT/US2013/040746 mailed Sep. 13, 2013, 14 pages.
Notice of Allowance for U.S. Appl. No. 13/567,168, mailed Nov. 26, 2013, 8 pages.
International Preliminary Report on Patentability for PCT/US2013/040746 mailed Nov. 20, 2014, 13 pages.
International Search Report and Written Opinion for PCT/US2014/056065 mailed Dec. 30, 2014, 9 pages.
Non-Final Office Action for U.S. Appl, No. 13/772,866, mailed May 5, 2015, 9 pages.

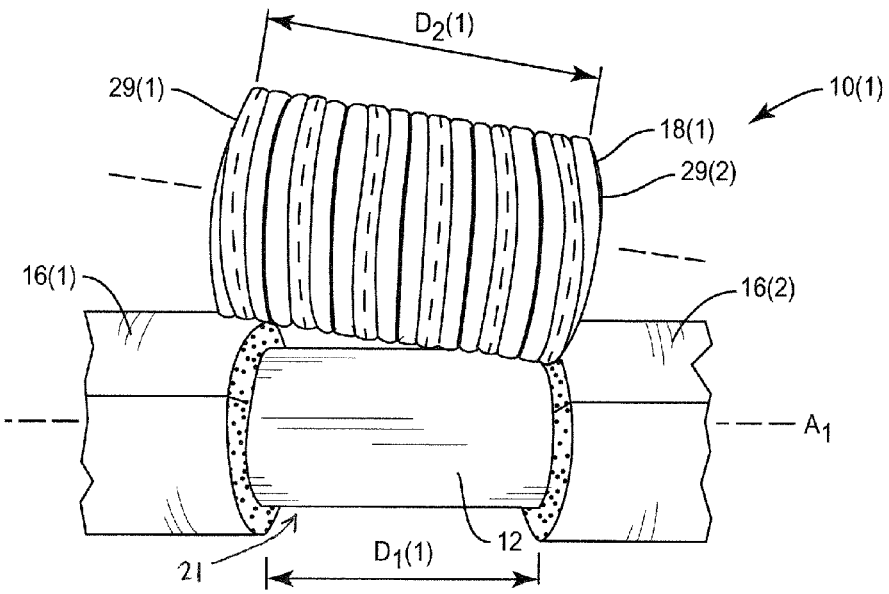
FIG. 4A
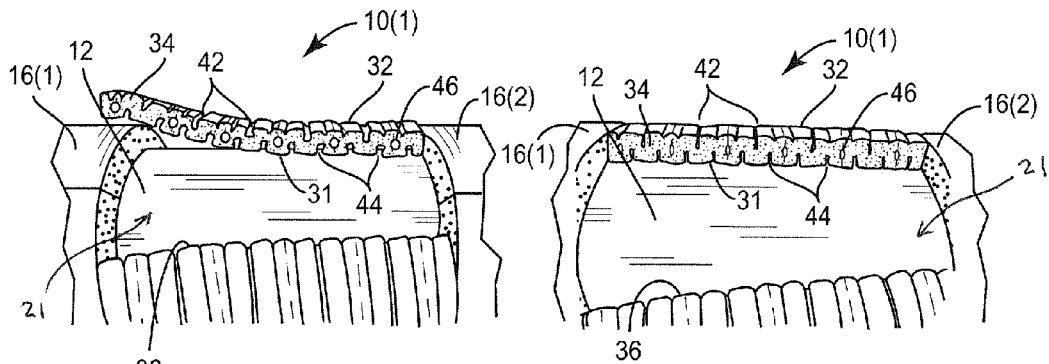
FIG. 4B    FIG. 4C
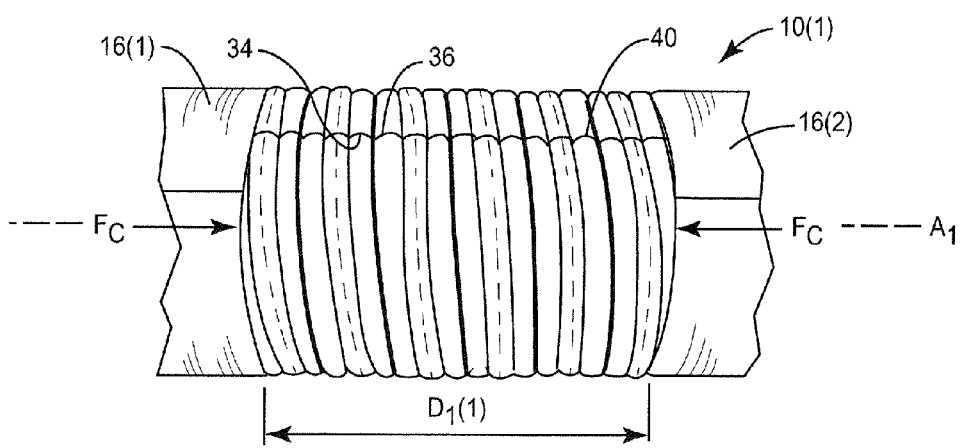
FIG. 4D

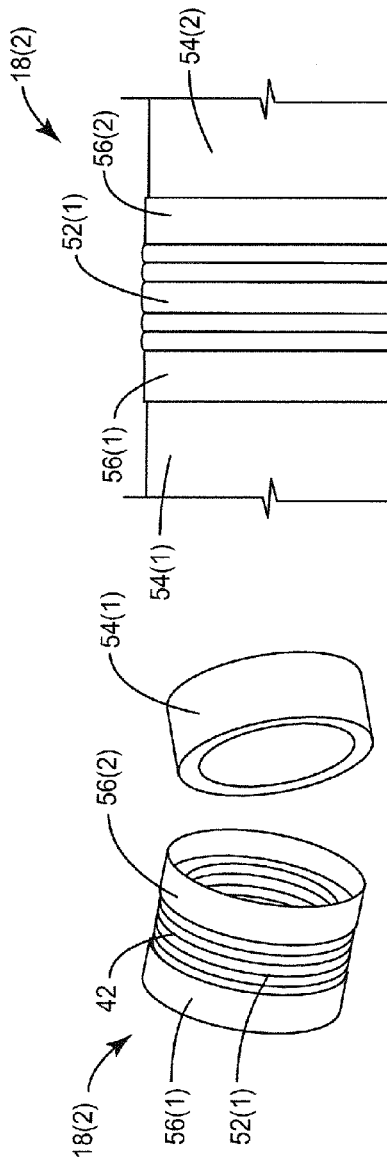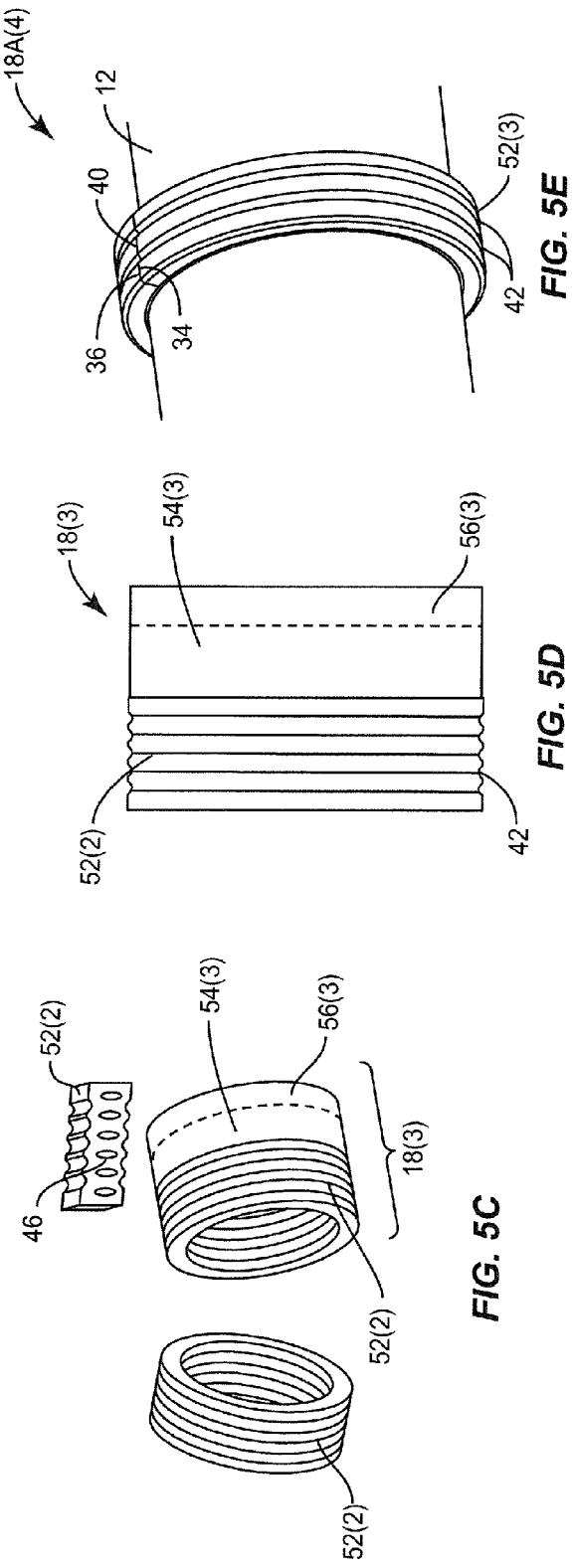

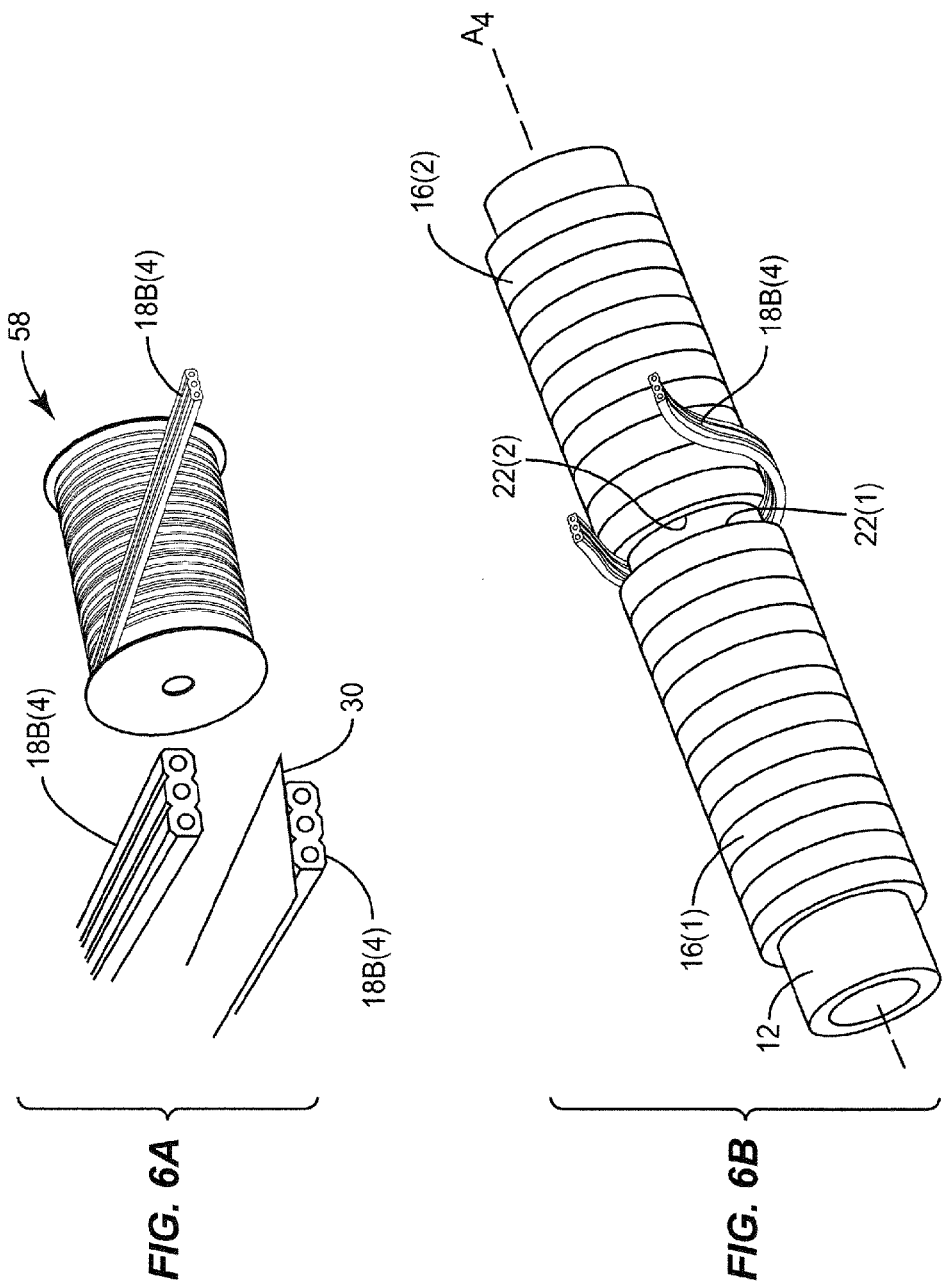

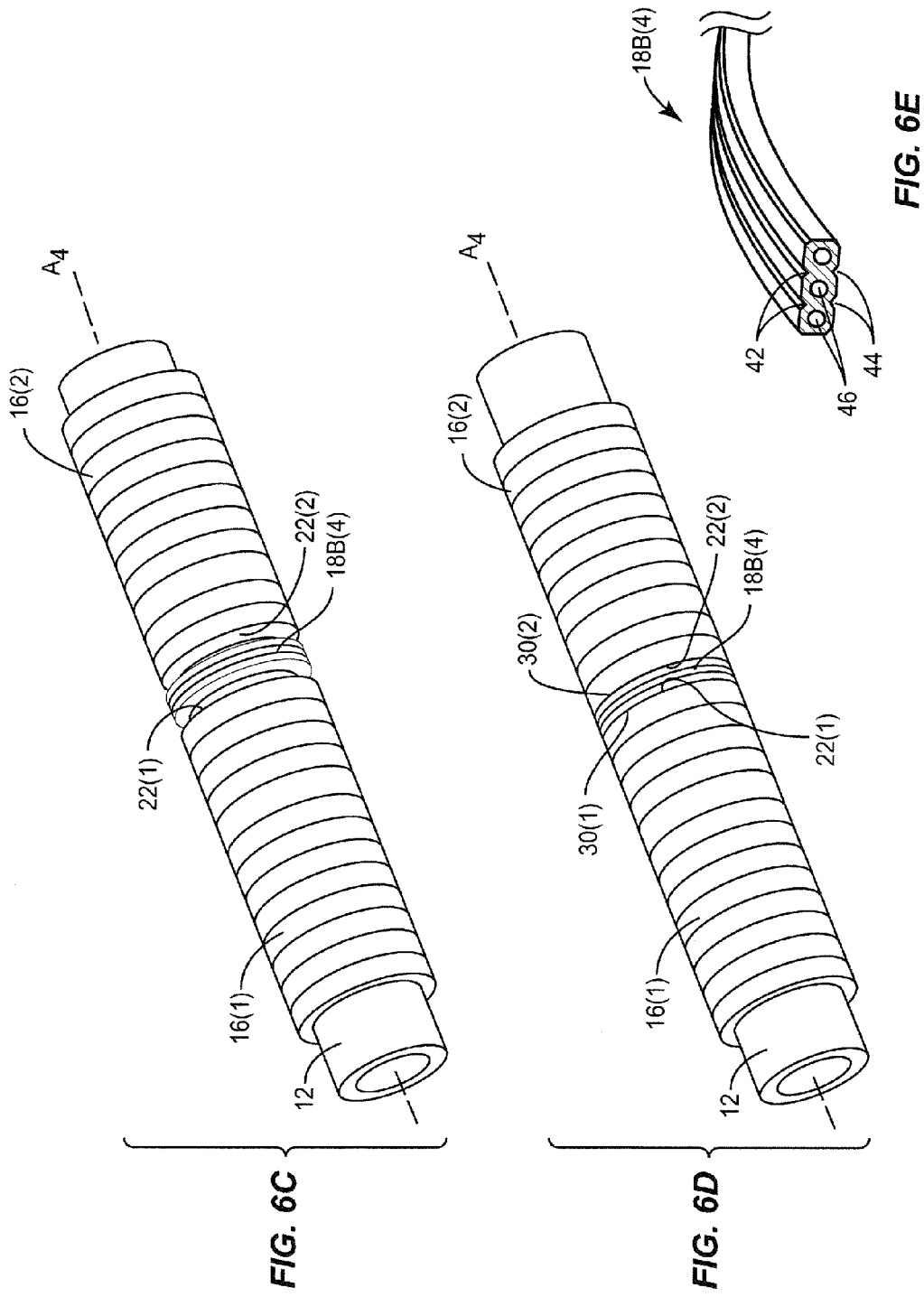

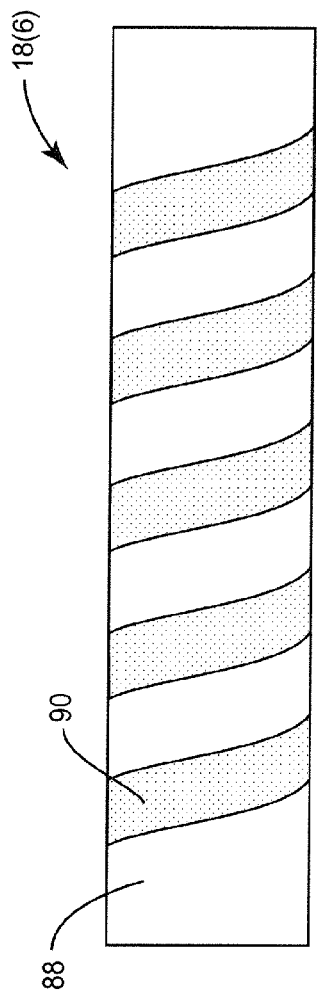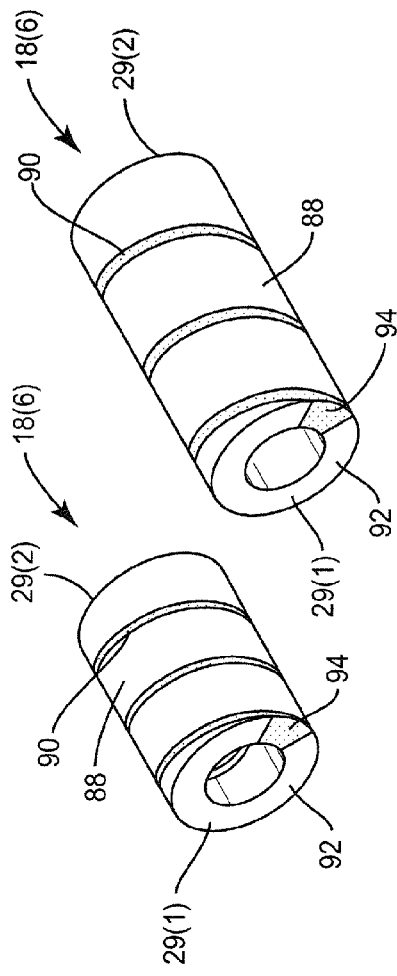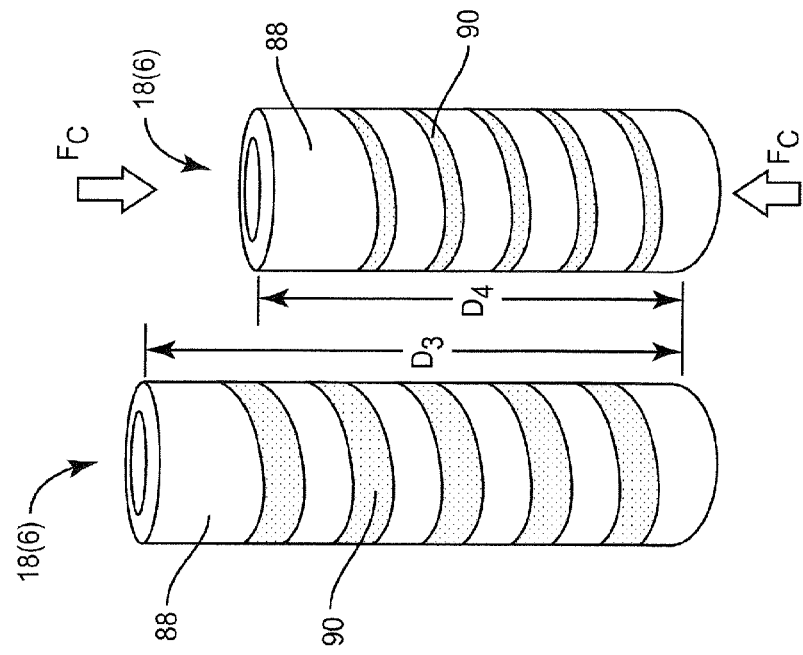
FIG. 9C
FIG. 9E
FIG. 9D
FIG. 9B
FIG. 9A

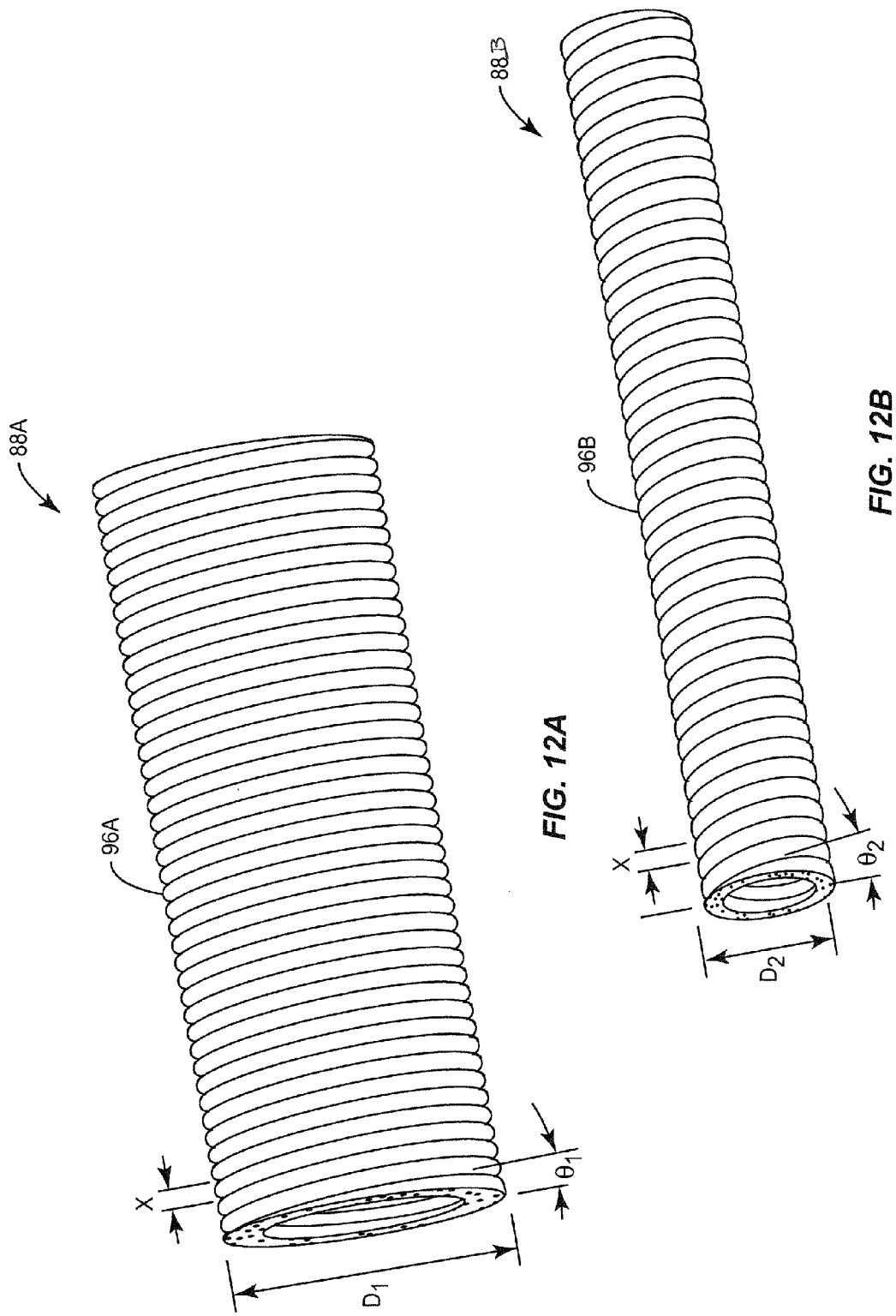

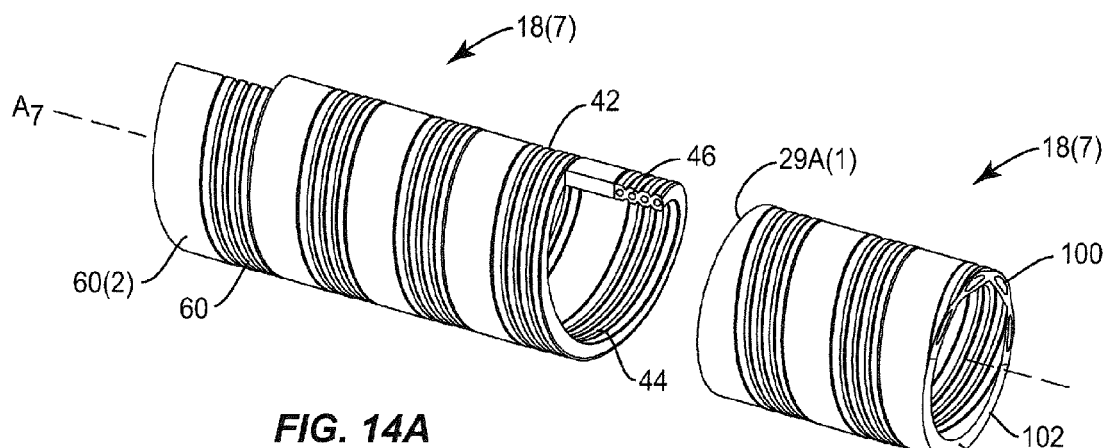
FIG. 14A
FIG. 14B
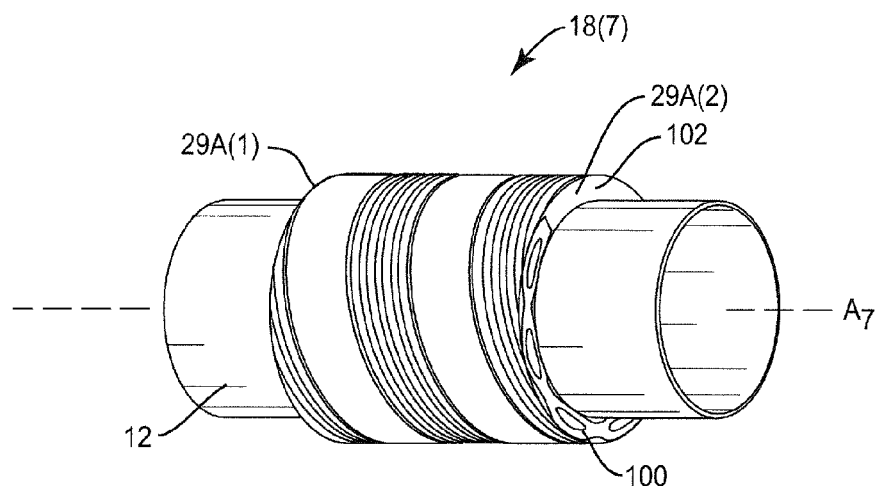
FIG. 14C

INSULATION SYSTEMS EMPLOYING EXPANSION FEATURES TO INSULATE ELONGATED CONTAINERS SUBJECT TO EXTREME TEMPERATURE FLUCTUATIONS, AND RELATED COMPONENTS AND METHODS

PRIORITY APPLICATION

The present application claims priority to U.S. Provisional Patent Application Ser. No. 61/646,049 filed on May 11, 2012 entitled "INSULATION PRODUCTS EMPLOYING EXPANSION JOINTS, AND RELATED COMPONENTS AND METHODS," which is incorporated herein by reference in its entirety

FIELD OF DISCLOSURE

The field of the disclosure relates to insulation products to provide insulation, including but not limited to pipes, tanks, vessels, etc. As a non-limiting example, the insulation products may be used with pipes that transport temperature-sensitive liquids such as petroleum, ammonia, liquid carbon dioxide, and natural gas.

BACKGROUND

Benefits of elongated containers, such as pipes, include their ability to transport very large quantities of liquids from a liquid source to one or more destination points. Pipes may be the transportation method of choice when extremely large quantities of liquids are desired to be continuously moved. The liquids being transported through the pipe may be phase-sensitive, meaning that the liquids may change to a solid or vapor within a range of ambient temperatures expected for the environment where the pipe will be located. The liquids transported through the pipe may also be viscosity-sensitive, meaning that the liquids may change viscosity within the range of ambient temperatures.

In this regard, heaters and/or coolers may be placed within the pipe to heat or cool a temperature of the liquid to ensure that the liquid stays within an acceptable temperature range to ensure a proper phase and viscosity during transportation thorough the pipe. An amount of energy needed for operation of the heaters and coolers may be reduced by insulating an external surface of the pipe. Typical insulations contact the external surface of the pipes, tanks, vessels, etc., and serve to reduce thermal energy loss by providing insulation properties around the exterior surfaces thereof.

Insulation members may be attached in segments along the length of a pipe. The insulation members may thermally change dimensions as contents of the pipe and/or ambient temperature fluctuate. In this manner, unwanted openings may form between insulation members as dimensions thermally change so that portions of the pipe may be without insulation at the unwanted openings, and thus piping system malfunctions or unwanted energy expenses may occur. Furthermore, unwanted openings between the insulation members may allow excessive moisture to collect between the pipe and the insulation members, and thus the excessive moisture may damage the pipe or significantly reduce the insulating properties of the insulation members. What is needed is an efficient and reliable insulation system to be used for elongated containers, such as pipes subjected to extreme temperature fluctuations.

SUMMARY OF THE DETAILED DESCRIPTION

Embodiments disclosed herein include insulation systems employing expansion features to insulate elongated containers subject to extreme temperature fluctuations, and related components and methods. Elongated containers, such as pipes, tanks, vessels may have contents that need to be insulated to prevent heat exchange with the outside environment. Insulation systems are disposed along the perimeter of the elongated containers to prevent the heat exchange. In cases where the insulation systems are subject to extreme temperature fluctuations, components of the insulation may thermally expand and/or contract, and may form gaps between the components. Alternatively, damaging stresses may be formed as the thermal dimensional changes may be restricted as part of the installation. The insulation system comprises expansion features to better enable the gaps to be filled and relieve damaging stresses. In this manner, the elongated containers may be efficiently insulated even while subjected to extreme temperature fluctuations.

In this regard, in one embodiment an insulation system for an exterior of an elongated container is disclosed. The insulation system comprises a foam expansion joint configured to be disposed around an elongated container. The foam expansion joint extends from a first longitudinal side to a second longitudinal side opposite the first longitudinal side. The foam expansion joint extends from a first latitudinal side to a second latitudinal side opposite the first latitudinal side. The insulation system further comprises at least one channel extending from the first longitudinal side to the second longitudinal side. The insulation system further comprises at least one longitudinal fastener configured to fasten the first longitudinal side proximate to the second longitudinal side to secure the foam expansion joint in a shape or substantially the shape of a cross-sectional perimeter of the elongated container. The at least one channel is configured to change shape to allow the foam expansion joint to change a longitudinal dimension and thereby enable the first latitudinal side and the second latitudinal side to respectively abut against a first insulation member and a second insulation member as a thermally-sensitive distance changes between the first insulation member and the second insulation member. In this manner, the gap between the first insulation member and the second insulation member may be more reliably insulated.

In another embodiment, an insulation system for an exterior of an elongated container is disclosed. The insulation system comprises a foam expansion joint extending from a first longitudinal side to a second longitudinal side opposite the first longitudinal side. The foam expansion joint extends from a first latitudinal side to a second latitudinal side opposite the first latitudinal side. The foam expansion joint is formed of at least two foam profiles. The at least two foam profiles comprise a first foam profile and a second foam profile, and two of the at least two foam profiles have different cross-sections. The insulation system further comprises at least one longitudinal fastener configured to fasten the first longitudinal side proximate to the second longitudinal side to secure the thermoplastic profile in a shape or substantially the shape of the elongated container. At least one of the different cross-sections is configured to change shape to allow the foam expansion joint to change a longitudinal dimension and thereby enable the first latitudinal side and the second latitudinal side to respectively abut against a first insulation member and a second insulation member as a thermally-sensitive distance changes between the first insulation member and the second insulation member. In this manner, the gap between the insulation members may be fully insulated.

In another embodiment, an insulation system for an exterior of an elongated container is disclosed. The insulation system comprises a foam expansion joint extending from a first longitudinal side to a second longitudinal side opposite the first longitudinal side. The foam expansion joint extends from a first latitudinal side to a second latitudinal side opposite the first latitudinal side. The foam expansion joint is formed or substantially formed of at least one foam profile in a helix shape. The insulation member further comprises at least one longitudinal fastener configured to fasten the first longitudinal side proximate to the second longitudinal side to secure the thermoplastic profile in a shape or substantially the shape of the elongated container. The first latitudinal side and the second latitudinal side are configured to respectively abut against a first insulation member and a second insulation member. In this manner, the gap between the insulation members may be insulated by efficiently-manufactured insulation.

In another embodiment, an insulation system for an exterior of an elongated container is disclosed. The insulation system comprises a foam insulation wrap comprising a foam expansion body extending from a first longitudinal side to a second longitudinal side opposite the first longitudinal side. The foam expansion joint extends from a first latitudinal side to a second latitudinal side opposite the first latitudinal side. The insulation system further comprises at least one channel extending from the first latitudinal side to the second latitudinal side. The insulation system further comprises least one longitudinal fastener configured to fasten the first longitudinal side proximate to the second longitudinal side to secure the foam expansion body in a shape or substantially the shape of the elongated container. The at least one channel is configured to change shape to keep the first longitudinal side proximate to the second longitudinal side during temperature fluctuations. In this way, the shape of the elongated container covered by the insulation wrap may be reliably insulated when subject to extreme temperature fluctuations.

In another embodiment, a method of creating an insulation system for an exterior of an elongated container is disclosed. The method comprises extruding at least one foam profile through an extruder. The method further comprises positioning the at least one foam profile each with a helix shape configured to be disposed around an elongated container. The at least one helix shape is positioned along a center axis. The method further comprises cutting the at least one foam profile at an angle to the center axis to form a first latitudinal side and a second latitudinal side of a foam expansion joint. The method further comprises cutting the at least one foam body parallel to the center axis to form a first longitudinal side and a second longitudinal side of the foam expansion joint. In this manner, the insulation system may be efficiently created.

In another embodiment, an insulation system created of different materials may be used to provide the insulation members and the expansion joints. The insulation members may be provided of a first material(s) to provide the desired thermal insulation characteristics and/or stiffness support characteristics. To facilitate the enhanced ability for the insulation products to counteract thermal expansion and/or contraction, a different material may be provided in expansion joints attached to insulation members. The material(s) selected for the expansion joints may have a different coefficient of thermal expansion from the insulation members, and may provide more flexibility to counteract thermal expansion and/or contraction. In this manner, a composite insulation product is formed with insulation members of a first material(s) type, and expansion joints of a second, different material(s) type. As a non-limiting example, engineered polyolefin insulation members having desired profiles may be employed to provide excellent insulation properties, moisture resistance, and support characteristics, but may not be able to counteract thermal expansion and contraction well. In another example, the expansion joints may be provided of a thermoset material, such as a polyurethane, to provide enhanced flexibility to allow the insulation members to counteract thermal expansion and contraction.

Non-limiting examples of thermoplastic materials that can be used include polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof. The density of the thermoplastic materials may be provided to any density desired to provide the desired resiliency and expansion characteristics.

Non-limiting examples of thermoset materials include polyurethanes, natural and synthetic rubbers, such as latex, silicones, EPDM, isoprene, chloroprene, neoprene, melamine-formaldehyde, and polyester, and derivatives thereof. The density of the thermoset material may be provided to any density desired to provide the desired resiliency and expansion characteristics. The thermoset material and can be soft or firm depending on formulations and density selections. Further, if the thermoset material selected is a natural material, such as latex for example, it may be considered biodegradable.

In another example, geometric characteristics or features may be provided to the expansion joint to provide less stiffness to allow the expansion joint to respond to the thermal expansion of the insulation members which determine a size of the gap to be filled by the expansion joint. Geometric characteristics may include, for example, channels (grooves), hinges, arcs, notches, cut segments, cell-size, foam density, and/or inner pathways.

In another example, an expansion joint may be extruded and wound around a spool for annealing to thermally form a radius of curvature as part of the expansion joint to make installation onto a pipe easier. The expansion joints may also be paid out from the spool in the field, and cut to sufficient length in the field to fully wrap the elongated container (e.g., pipe) circumference and thus make installation of the expansion joint more convenient.

In another example, an expansion joint may be formed as a spiral to allow a single extrusion to be made into an integrated piece to insulate a portion of the pipe. The spiral may be cut orthogonal to a center axis to form end surfaces to abut against the insulation members. The expansion joint formed as the spiral may include multiple extrusions of different material and geometric characteristics. When geometric characteristics are added to the extrusions making up the expansion joint, the end surfaces may be solid or not solid.

In another embodiment, an expansion joint may be formed that may be factory compressed and/or annealed at an elevated temperature so that a precompression of the expansion joint is included, so that further compression during installation may be reduced or eliminated to make installation more convenient. In this example, when the exterior surface of the pipe reaches an operating temperature cycles, the insulation members may contract and therefore the expansion joint may increase to an expanded length to cover the increased gap between insulation members. When the piping system is turned off or cycled as is common in refrigeration systems, for example, the insulation members may expand again and the expansion member may contract to an original pre-compressed state.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF FIGURES

FIGS. 4A-4D are perspective side views of the expansion joint of FIG. 1A being installed to be part of the insulation system, illustrating respectively, the insulation system before the expansion joint is installed, the expansion joint installed by being disposed between the insulation members, and a partial cutaway of the expansion joint after installation as part of the insulation system;

FIGS. 5A and 5B are a perspective view and a side view, respectively, of an alternative example of an expansion joint which is partially assembled and fully assembled;

FIGS. 5C and 5D are a perspective view and a side view of another embodiment of an expansion joint, comprising a first section attached to an end section with an alternative attachment member, thereby illustrating inner channels, outer channels, and inner passageways;

FIG. 5E depicts a perspective view of an expansion joint that may be another example of the expansion joint of FIG. 2B;

FIG. 6A is a perspective view of another example of an expansion joint extruded and then wound upon a spool for convenient non-factory installations, to become part of an insulation system;

FIGS. 6B-6D are perspective views of process steps to install the expansion joint of FIG. 6A upon an elongated container;

FIG. 6E is a cross-section perspective view of the expansion joint of FIG. 6A;

FIGS. 9A-9B depict perspective views of another embodiment of an expansion joint, comprising a first insulation section with a helical shape and a second insulation section in a helical shape, to ensure the gap between the insulation members is fully insulated, illustrating different material performances wherein the second insulation section is more flexible than the first insulation section;

FIG. 9C is a side view of the expansion joint of FIG. 9A in an uncompressed state, illustrating the helical shape of the first insulation section and the helical shape of the second insulation section;

FIGS. 9D and 9E are perspective views of the expansion joint of FIG. 9C illustrating end surfaces of the expansion joint after cutting at two different lengths, respectively, as part of an exemplary manufacturing process, to illustrate forming a planar surface at the end surfaces which may provide a continuous surface to abut against the abutment surfaces of the insulation members of FIG. 2B;

FIGS. 12A and 12B are perspective views of two other examples of first insulation sections, illustrating the helical pitch angle will vary inversely with diameter for an identical dimension;

FIGS. 14A and 14B are top perspective views of the expansion joint of FIG. 13B after thermal bonding, and after cutting to form end faces, respectively, illustrating the end faces comprised of a portion of the foam profile and a portion of the second foam profile;

FIG. 14C is a perspective view of the expansion joint of FIG. 14C installed upon the pipe, illustrating the end faces available to abut against the insulation members of FIG. 2A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include insulation systems employing expansion features to insulate elongated containers subject to extreme temperature fluctuations, and related components and methods. Elongated containers, such as pipes, tanks, vessels may have contents that need to be insulated to prevent heat exchange with the outside environment. Insulation systems are disposed along the perimeter of the elongated containers to prevent the heat exchange. In cases where the insulation systems are subject to extreme temperature fluctuations, components of the insulation may thermally expand and/or contract, and may form gaps between the components. Alternatively, damaging stresses may be formed as the thermal dimensional changes may be restricted as part of the installation. The insulation system comprises expansion features to better enable the gaps to be filled and relieve damaging stresses. In this manner, the elongated containers may be efficiently insulated even while subjected to extreme temperature fluctuations.

It is noted that the expansion features comprise a combination of geometric and material features provided as part of the insulation system to provide a precise stiffness to allow the insulation system to respond when subjected to extreme temperature fluctuations. Geometric features may include, for example, channels (grooves), hinges, arcs, notches, cut segments, cell-size, foam density, and/or inner pathways.

Figure 1A:
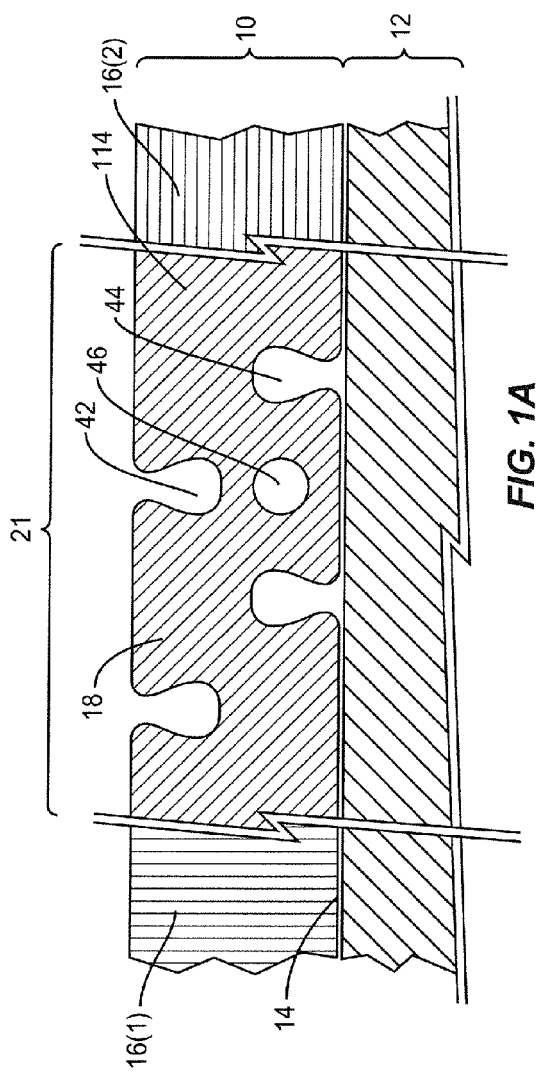
FIG. 1A is a cutaway close-up side view of an exemplary first embodiment of an insulation system disposed around an elongated container, the insulation system including insulation members and an exemplary foam expansion joint disposed between the insulation members, illustrating at least one channel and inner passageway of the foam expansion joint.
Figure 1B:
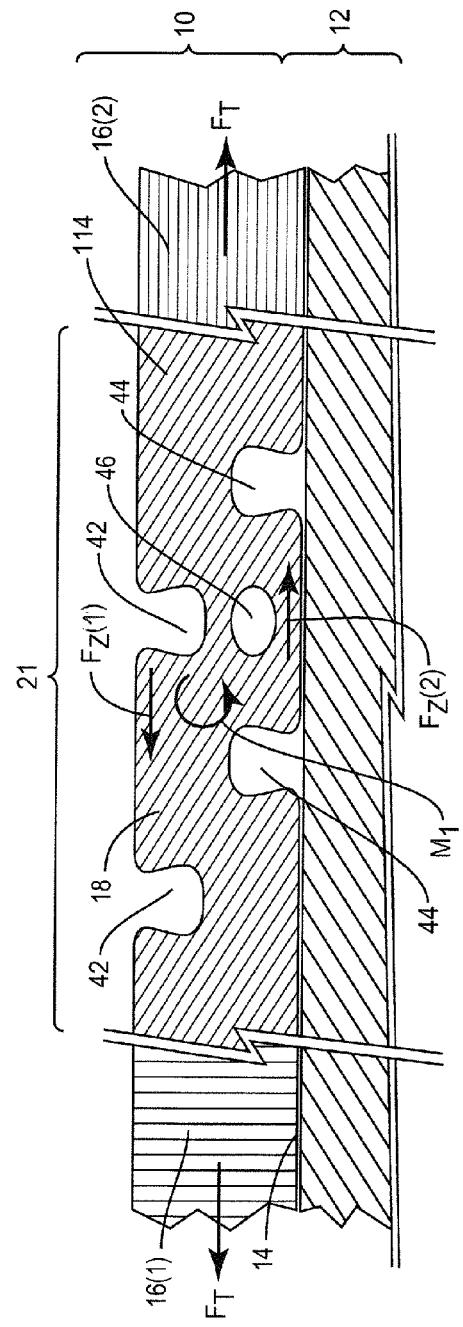
FIG. 1B is a cutaway close-up side view of the expansion joint of the insulation system of FIG. 1A under tension, wherein the insulation members thermally shrink and pull upon the expansion joint thereby causing expansion of the expansion joint.

In order to illustrate the fundamental concepts of this disclosure, FIGS. 1A and 1B are cutaway views of an exemplary insulation system 10 disposed proximate to an external surface 14 of an elongated container 12, wherein the insulation system 10 is subject to a datum temperature and a lower temperature, respectively. The insulation system 10 may comprise an expansion joint 18 disposed in a gap 21 between insulation members 16(1), 16(2). The insulation members 16(1), 16(2) have a thermal expansion coefficient wherein they expand parallel to the external surface 14 of the elongated container 12 when subject to temperature increases, and they contract parallel to the external surface 14 when subject to decreasing temperatures. Accordingly, the gap 21 thermally changes dimensions. The elongated container 12 will be efficiently insulated when the gap 21 is fully occupied by the expansion joint 18.

The expansion joint 18 has several features to enable the gap 21 to be efficiently insulated. The expansion joint 18 comprises a foam expansion body 114 made of foam, for example, thermoplastic and/or thermoset, to provide insulation performance to the elongated container 12. The expansion joint 18 may also comprise one or more expansion features comprising at least one inner channel 44, at least one outer channel 42, and/or at least one inner passageway 46, which are configured to change shape when subject to forces $F_T$ from the insulation members 16(1), 16(2). The changing shape of these expansion features better enables the expansion joint 18 to fill the gap 21 between the insulation members 16(1), 16(2).

With continued reference to FIGS. 1A and 1B, it is noted that the outer channels 42 and the inner channels 44 may be positioned in a staggered arrangement along the external surface 14. The staggered arrangement in combination with the forces $F_T$ from the insulation members 16(1), 16(2) create non-aligned internal forces $Fz(1)$, $Fz(2)$ forming at least one force moment $M_1$ which enables the expansion joint 18 to further change shape to fill the gap 21 between the insulation members 16(1), 16(2).

Now that the insulation system concept has been described using FIGS. 1A-1B, various examples of an insulation system comprising an expansion joint will be discussed relative to FIGS. 2A-21C. Then FIGS. 22A-23B will be described in relation to an insulation wrap that is closely related to the expansion joint. Finally, exemplary methods for creating the insulation wrap will be discussed in relation to FIGS. 24A-24B.

Figure 2A:
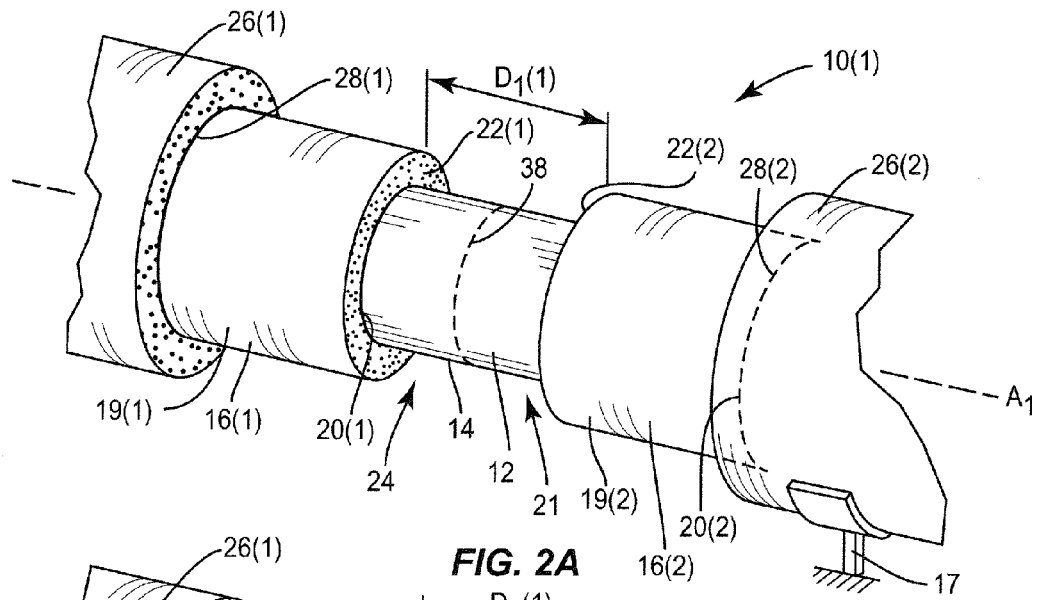
FIGS. 2A-2C are perspective side views of the insulation system of FIG. 1A installed upon a pipe, illustrating respectively, the insulation system with the expansion joint hidden, the expansion joint disposed between the insulation members, and a partial cutaway of the expansion joint.
Figure 2B:
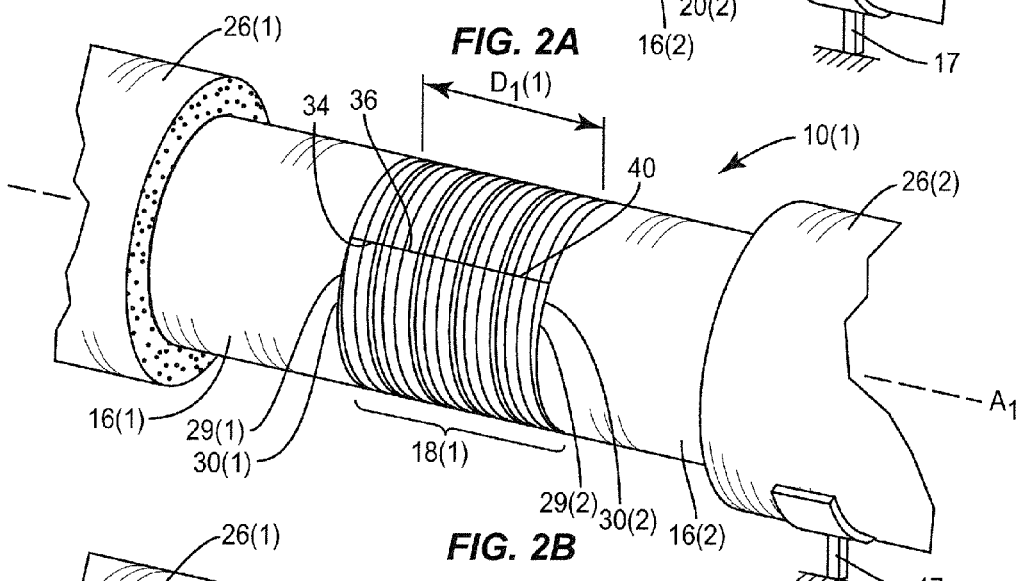
Figure 2C:
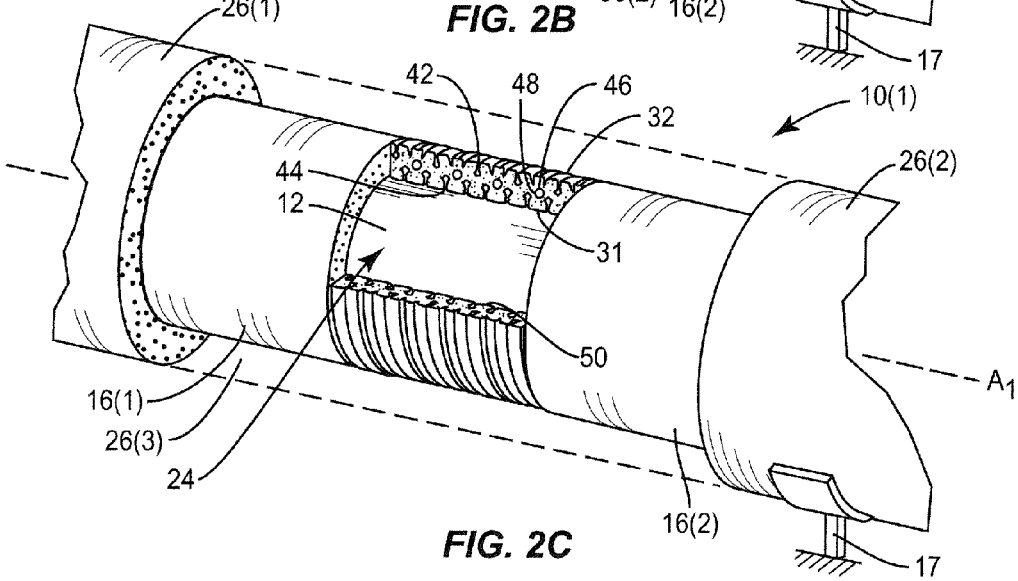

In this regard, FIGS. 2A-2C are perspective side views of a first embodiment of an insulation system 10(1) disposed around an elongated container 12. The elongated container 12 may be, for example, a pipe for liquid, gas, or vapor flow. FIG. 2A does not include all components of the insulation system 10(1) in order to show the pipe 12. The pipe 12 (or other "elongated container") may be a natural gas pipeline carrying a temperature-sensitive liquid such as liquefied natural gas (LNG) through an inside passageway at less than negative one-hundred sixty-two (-162) degrees Celsius, or a refrigerant pipe carrying refrigerant to a food-processing freezer at sub-zero (0) degrees Fahrenheit, as non-limiting examples. The pipe 12 may be made of a strong pressure-resistant material, for example, metal, composite, or hardened plastic. An external surface 14 of the pipe 12 may be concentric about a center axis $A_1$. The ends of the pipe are depicted as being broken to show indeterminate length parallel to the center axis $A_1$ in FIGS. 2A-2C.

The pipe 12 may be installed in an ambient environment which may include, for example, ambient temperatures from negative fifty (-50) to forty (+40) degrees Celsius. The ambient environment may include humidity. An operating temperature $T_O$ as used herein is a temperature of the external surface 14 of pipe 12 when contents flow through the pipe 12. The operating temperature $T_O$ as used herein is always different than the ambient temperature. When contents do not flow through the pipe 12, then the temperature of the exterior of the pipe 12 may reach ambient temperature at equilibrium.

If the pipe 12 is not insulated, the external surface 14 of the pipe 12 may be exposed to the ambient environment, and damage and/or expense may occur. The damage and/or expense may include, for example, higher energy expense, accumulation of ice, corrosion, breakage and/or leakage of the pipe 12.

The insulation system 10(1) may include at least two insulation members 16(1), 16(2), an expansion joint 18(1) (FIG. 1B), and second layer insulation members 26(1), 26(2). The insulation members 16(1), 16(2) may be made, for example, of a polymeric material with a density or stiffness high enough to prevent deformation when supported directly or indirectly by a pipe support 17. The insulation members 16(1), 16(2) may each include an external surface 19(1), 19(2) and an internal surface 20(1), 20(2), respectively. The internal surface 20(1), 20(2) of the insulation members 16(1), 16(2) may abut against the external surface 14 of the pipe 12 and thereby may minimize convection heat transfer between the pipe 12 and atmosphere.

The second layer insulation members 26(1), 26(2) may include inward-facing surfaces 28(1), 28(2) abutting against the external surfaces 19(1), 19(2) of the insulation members 16(1), 16(2), respectively, to prevent convection heat transfer and radiant heat transfer with the ambient environment. The second layer insulation members 26(1), 26(2) may be made, for example, of a polymeric material with a density high enough to prevent deformation when supported directly or indirectly by the pipe support 17.

The insulation members 16(1), 16(2) may include abutment surfaces 22(1), 22(2), which may become separated by a gap 21 of a distance $D_1(1)$ when the insulation members 16(1), 16(2) and the external surface of the pipe 12 may be at the ambient temperature. The distance $D_1(1)$ is meant to describe the gap 21 into which an installer would insert/install the expansion joint 18(1), and may also describe the size of the gap that may occur due to thermal contraction. As shown in FIG. 2B, the gap 21 may be filled by the expansion joint 18(1) configured to insulate a portion 24 of the pipe 12 in the gap 21.

Figure 3A:
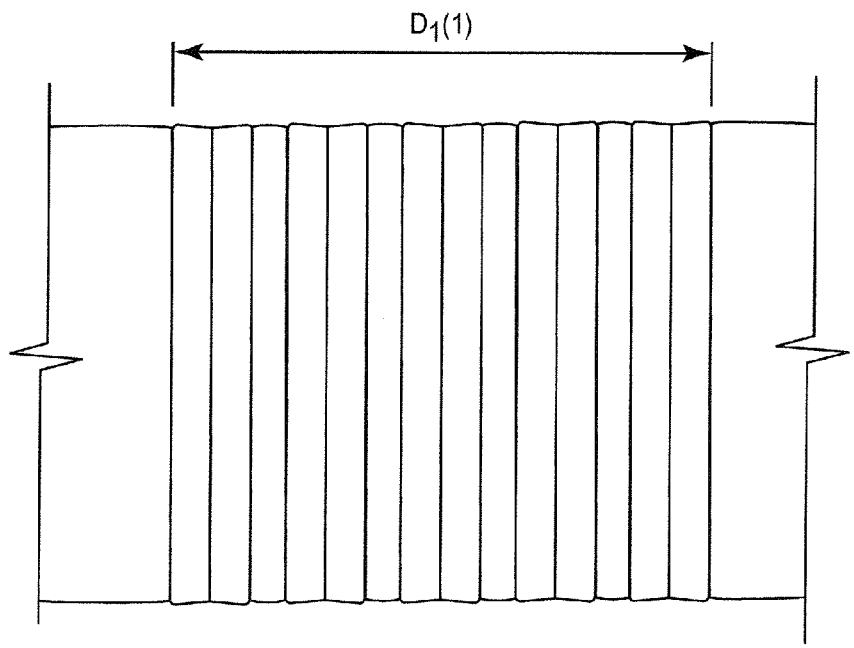
FIGS. 3A and 3B are side views depicting the insulation members and the expansion joint of FIG. 1A as an external surface of the elongated container reaches an ambient temperature and the operating temperature, respectively.
Figure 3B:
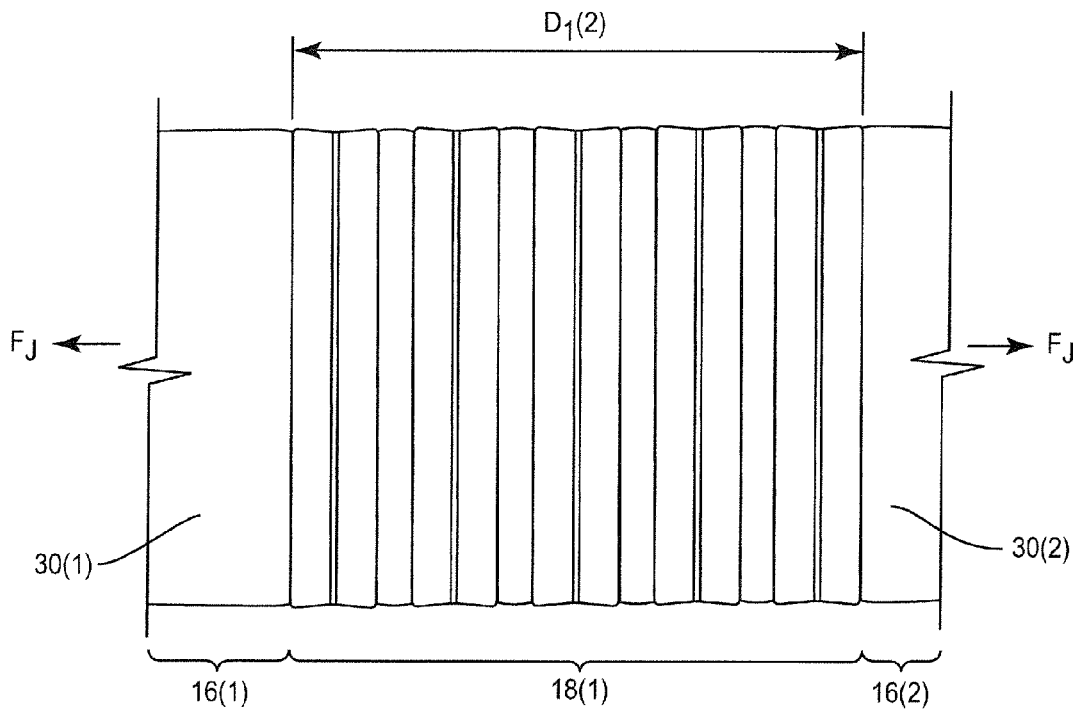

The insulation members 16(1), 16(2) may include a thermal expansion coefficient which may enable the insulation members 16(1), 16(2) to contract parallel to the center axis $A_1$ when the external surface 14 of the pipe 12 reaches the operating temperature $T_O$. FIGS. 3A and 3B are side views depicting the insulation members 16(1), 16(2) and the expansion joint 18(1) of FIG. 2B when the external surface of the pipe 12 reaches the ambient temperature and the operating temperature $T_O$, respectively. When the insulation members 16(1), 16(2) contract, then the gap 21 may widen to a distance of $D_1(2)$ when the external surface 14 of the pipe 12 reaches the operating temperature $T_O$. The distance $D_1(2)$ may be longer than the distance $D_1(1)$ parallel to the center axis $A_1$. This longer distance $D_1(2)$ requires the expansion joint 18(1) to expand to completely fill the gap 21. When the external surface 14 of the pipe 12 again reaches ambient temperature as the flow may cycle between on and off, the gap 21 may return to the distance $D_1(1)$ and the expansion joint 18(1) may contract to fill this gap 21.

With reference back to FIG. 2B, the insulation system 10(1) may include attachment members 30(1), 30(2) to attach the expansion joint 18(1) to the insulation members 16(1), 16(2), respectively. The attachment members 30(1), 30(2) may comprise, for example, duct tape, adhesive material(s), thermal weld(s), and/or cohesive material(s). The attachment members 30(1), 30(2) may allow the gap 21 to be fully filled by the expansion joint 18(1) as the temperature of the exterior of the pipe 12 changes and as the ambient temperature changes. The attachment members 30(1), 30(2) may also be configured to seal the gap 21 to prevent humidity from the ambient environment from reaching the pipe 12, where damaging ice could develop. The attachment members 30(1), 30(2) seal the gap 21 by preventing humidity and airflow from moving between end surfaces 29(1), 29(2) (or "first and second latitudinal sides") of the expansion joint 18(1) and the abutment surfaces 22(1), 22(2) of the insulation members 16(1), 16(2), respectively. The attachment members 30(1), 30(2) may allow the gap 21 to be fully filled by the expansion joint 18(1) imparting a joint force $F_J$ (FIG. 3B) upon the expansion joint 18(1). The joint force $F_J$ may be parallel to the center axis $A_1$, and may be a compressive or tensile force upon the expansion joint 18(1).

With reference back to FIG. 2C, the expansion joint 18(1) may include an internal surface 31 and an external surface 32 opposite the internal surface 31. The internal surface 31 of the expansion joint 18(1) may be configured to abut against the portion 24 of the external surface 14 of the pipe 12 to better insulate the pipe 12 by minimizing convection heat transfer from the external surface 14 of the pipe 12.

The expansion joint 18(1) may extend from a first surface 34 (or "first longitudinal side") to a second surface 36 (or "second longitudinal side") along a perimeter 38 (FIGS. 2A and 2B) of the external surface 14 of the pipe 12. The perimeter 38 may be in a geometric plane perpendicular to the center axis $A_1$ and the perimeter 38 may be concentric to the center axis $A_1$. The first surface 34 and the second surface 36 may be attached using a second attachment member 40. The second attachment member 40 may comprise, for example, duct tape, adhesive material(s), thermal weld(s), and/or cohesive material(s). The second attachment member 40 may allow the expansion joint 18(1) to remain in abutment with the pipe 12 and prevent humidity from the ambient environment from reaching the pipe 12. Further, the second attachment member 40 may be installed parallel to axis $A_1$ (FIG. 2B) or parallel to outer channels 42 (FIG. 2C) so as to not inhibit the expansion or contraction of the outer channels 42, the inner channels 44 (FIG. 2C), or inner passageway 46 (FIG. 2C).

As shown in FIG. 2C, the external surface 32 of the expansion joint 18(1) may include outer channels 42 and the internal surface 31 may include inner channels 44. The outer channels 42 and the inner channels 44 may be formed with an extrusion process. The inner channels 44 and the outer channels 42 may be grooves including a curvilinear shape. The inner channels 44 and the outer channels 42 may extend from the first surface 34 to the second surface 36 (FIG. 2B). The inner channels 44 and the outer channels 42 may reduce the stiffness of the expansion joint 18(1) in a direction parallel to the center axis $A_1$, and may each be disposed orthogonal to the center axis $A_1$ to enable the expansion joint 18(1) to expand in a direction parallel to the center axis $A_1$ to keep the gap 21 filled and the portion 24 of the pipe 12 insulated.

With continuing reference to FIG. 2C, the expansion joint 18(1) may further include at least one inner passageway 46 disposed between the internal surface 31 and the external surface 32 of the expansion joint 18(1). The inner passageway 46 may be formed through an extrusion process. Each of the at least one inner passageway 46 may extend from a first opening 48 in the first surface 34 to a second opening 50 in the second surface 36 (FIG. 2B). The inner passageway 46 may reduce the stiffness of the expansion joint 18(1) in a direction parallel to the center axis $A_1$, and may be disposed orthogonal to the center axis $A_1$ to enable the expansion joint 18(1) to expand in a direction parallel to the center axis $A_1$ to keep the gap 21 filled and the portion 24 of the pipe 12 insulated.

FIG. 2C depicts a second layer insulation member 26(3) that may be disposed between the second layer insulation members 26(1), 26(2) to further insulate the pipe 12 from the atmosphere. The second layer insulation member 26(3) may abut against the external surface 32 of the expansion joint 18(1). It is noted that the gap 21 may still expand and contract between the distance $D_1(1)$ and $D_1(2)$ as the temperature of the external surface 14 of the pipe 12 changes (FIGS. 3A and 3B).

FIGS. 4A-4C depict the expansion joint 18(1) being installed to be part of the insulation system 10(1) of FIGS. 2A-2C. The expansion joint 18(1) may include a distance $D_2(1)$ between the end surfaces 29(1), 29(2) when not installed in the gap 21 and at the ambient temperature. The distance $D_2(1)$ may be greater than the distance $D_1(1)$ of the gap 21 at the ambient temperature. The expansion joint 18(1) may be compressed in order to be installed into the gap 21. For example, if the gap 21 has the distance $D_1(1)$ of ten (10) inches and the expansion joint 18(1) has the distance $D_2(1)$ of twelve (12) inches, then the expansion joint 18(1) may be compressed to within ten (10) inches to fit within the gap 21. Compressing the expansion joint 18(1) having a distance $D_2(1)$ greater than the distance $D_1(1)$ allows the expansion joint 18(1) to be disposed in the gap 21 with a compression force $F_C$ (FIG. 4D). Attachment members 30(1), 30(2) may be under compression by compressive force $F_C$ or attachment members 30(1), 30(2) may be installed after expansion joint 18(1) is disposed in the gap 21 with compressive force $F_C$, to provide a better seal against humidity from the ambient environment reaching the pipe 12. Further, the compression force $F_C$ allows the expansion joint 18(1) to better expand to fill the gap 21 when the gap 21 expands to a distance $D_1(2)$ as the external surface 14 of the pipe 12 reaches the operating temperature $T_O$.

The expansion joint 18(1) may be installed into the gap 21 with the first surface 34 installed before the second surface 36, or vice versa. FIG. 4C depicts the first surface 34 being installed initially in the gap 21. The outer channels 42, inner channels 44, and the at least one inner passageway 46 may at least partially close as the expansion joint 18(1) is installed in the gap 21, as depicted in the differences between FIGS. 4B and 4C. The expansion joint 18(1) may contract to within the distance $D_1(1)$ as the outer channels 42 and inner channels 44, and the at least one inner passageway 46 may at least partially close. In addition, a material of the expansion joint 18(1) may contract to help the expansion joint 18(1) more easily fit within the gap 21.

As is depicted in FIG. 4D, when both the first surface 34 and the second surface 36 are installed into the gap 21, then the second attachment member 40 may attach the first surface 34 and second surface 36, and the attachment member 30(1), 30(1) may attach the expansion joint 18(1) to the insulation members 16(1), 16(2). The attachment members 30(1), 30(2) and second attachment member 40 may be provided to the insulation system 10(1) with, for example, a heat gun and/or adhesive applicator.

In another embodiment, different materials may be used to provide the insulation members and the expansion joints. The insulation members may be provided of a first material(s) to provide the desired thermal insulation characteristics and/or stiffness support characteristics. To facilitate the enhanced ability for the insulation products to counteract thermal expansion and/or contraction, a different material may be provided in expansion joints attached to insulation members. The material(s) selected for the expansion joints may have a different coefficient of thermal expansion from the insulation members, and thus provide more flexibility to counteract thermal expansion and/or contraction. In this manner, a composite insulation product is formed with insulation members of a first material(s) type, and expansion joints of a second, different material(s) type. As a non-limiting example, engineered thermoplastic insulation members having desired profiles may be employed to provide excellent insulation properties, moisture resistance, and support characteristics, but may not be able to counteract thermal expansion and contraction well. In another example, the expansion joints may be provided of a thermoset material, such as a polyurethane, to provide enhanced flexibility to allow the insulation members to counteract thermal expansion and contraction.

Non-limiting examples of thermoplastic materials that can be used include polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof.

Non-limiting examples of thermoset materials include polyurethanes, natural and synthetic rubbers, such as latex, silicones, EPDM, isoprene, chloroprene, neoprene, melamine-formaldehyde, and polyester, and derivatives thereof. The density of the thermoset material may be provided to any density desired to provide the desired resiliency and expansion characteristics. The thermoset material can be soft or firm, depending on formulations and density selections. Further, if the thermoset material selected is a natural material, such as latex for example, it may be considered biodegradable.

In this regard, FIGS. 5A-5E depict alternative examples of the expansion joint 18(1). FIGS. 5A-5B depict an expansion joint 18(2). The expansion joint 18(2) may operate similar to the expansion joint 18(1) of FIG. 2B, as discussed previously. However, the expansion joint 18(2) may comprise a first section 52(1) and at least one end section 54(1), 54(2) attached by third attachment members 56(1), 56(2). The third attachment members 56(1), 56(2) may comprise, for example, duct tape, adhesive material(s), thermal weld(s), and/or cohesive material(s). FIG. 5A shows the end section 54(1) may be detached from the first section 52(1) and the third attachment member 56(1). FIG. 5B depicts the expansion joint 18(2) with the at least one end sections 54(1), 54(2) attached by the third attachment members 56(1), 56(2). The end sections 54(1), 54(2) may be made of a different material having more resilience than the first section 52(1). More resiliency may allow the expansion joint 18(2) to expand or contract more quickly to respond to dimensional changes of the gap 21. The different material of the end sections 54(1), 54(2) may comprise, for example, a polyolefin or thermoset materials.

The first section 52(1) may also include outer channels 42. The outer channels 42 may reduce the stiffness of the first section 52(1) to allow the expansion joint 18(2) to more easily fit within the gap 21.

FIGS. 5C-5D depict a perspective and a side view of an expansion joint 18(3) which is another example of the expansion joint 18(1). The expansion joint 18(3) may operate similar to the expansion joint 18(1) of FIG. 2B, as discussed previously. However, the expansion joint 18(3) may comprise a first section 52(2) attached to an end section 54(3) with an alternative attachment member 56(3). The alternative attachment member 56(3) may comprise, for example, duct tape, adhesive material(s), thermal weld(s), and/or cohesive material(s). The end section 54(3) may be made of a different material that may be more resilient than the first section 52(2). The more resiliency may allow the expansion joint 18(3) to expand or contract more quickly to respond to dimensional changes of the gap 21. The different material of the end sections 54(1), 54(2) may comprise, for example, polyolefin or thermoset materials.

The first section 52(2) may also include outer channels 42, inner channels 44, and at least one inner passageway 46, which may reduce the stiffness of the first section 52(2). The reduction of stiffness may allow the expansion joint 18(3) to more easily fit within the gap 21.

It is noted that in FIG. 5C, a small portion of the first section 52(2) is provided atop the expansion joint 18(3) to illustrate the inner passageways 46. It is also noted that in FIG. 5C, a first section 52(2) is provided to the left of the expansion joint 18(3) to better illustrate the outer channels 42 and the inner channels 44.

FIG. 5E depicts a perspective view of an expansion joint 18A(4) which may be another example of the expansion joint 18(1). In FIG. 5E, the expansion joint 18A(4) is insulating a pipe 12. The expansion joint 18A(4) may operate similar to the expansion joint 18(1) of FIG. 2B, as discussed previously. The expansion joint 18A(4) may comprise a first section 52(3) with outer channels 42 to reduce stiffness of the expansion joint 18A(4). The expansion joint 18A(4) may extend from a first surface 34 to a second surface 36 opposite the first surface 34. The first surface 34 and the second surface 36 may be connected at a second attachment member 40 to prevent the expansion joint 18A(4) from detaching from the pipe 12.

In another embodiment shown in FIG. 6A, an expansion joint 18B(4) may be similar to the expansion joint 18A(4) and so only the differences will be discussed for clarity and conciseness. The expansion joint 18B(4) may be extruded and then wound around a spool 58 for annealing to thermally form a radius of curvature as part of the expansion joint 18B(4) to make installation onto the pipe 12 easier. The expansion joints 18B(4) may also be paid out from the spool 58 in the field (as opposed to the factory), and cut to sufficient length in the field to fully wrap the elongated container (e.g., pipe) circumference and thus make installation of the expansion joint more convenient.

In this regard, FIGS. 6A-6D depict perspective views of process steps to install the expansion joint 18B(4) upon a pipe 12 including a center axis $A_4$. FIG. 6A depicts the expansion joint 18B(4) may be paid out from a spool 58. The spool 58 may allow the expansion joint 18B(4) to be conveniently stored and transported. The expansion joint 18B(4) may be spooled without (as depicted in the top left of FIG. 6A) or with an attachment member 30 (as shown at the bottom left of FIG. 6A).

FIGS. 6B-6C depict that the expansion joint 18B(4) may be compressed parallel to the center axis $A_4$ and disposed around the pipe 12 and between the insulation members 16(1), 16(2).

FIG. 6D depicts the expansion joint 18B(4) installed on pipe 12 and with insulation members 16(1), 16(2) moved to abut against expansion joint 18(4) so that the abutment surfaces 22(1), 22(2) of the insulation members 16(1), 16(2) are respectively in contact with the expansion joint 18B(4). The expansion joint 18B(4) may then be joined with the attachment members 30(1), 30(2) to the insulation members 16(1), 16(2). In this manner, the outer channels 42 of the expansion joint 18B(4), the inner channels 44 of the expansion joint 18B(4), and the inner passageways 46 of the expansion joint 18B(4), as depicted in a cross-section perspective view of FIG. 6E, can be configured to change shape to allow expansion and contraction of the expansion joint 18B(4) to maintain contact with the insulation members 16(1), 16(2).

Figure 7A:
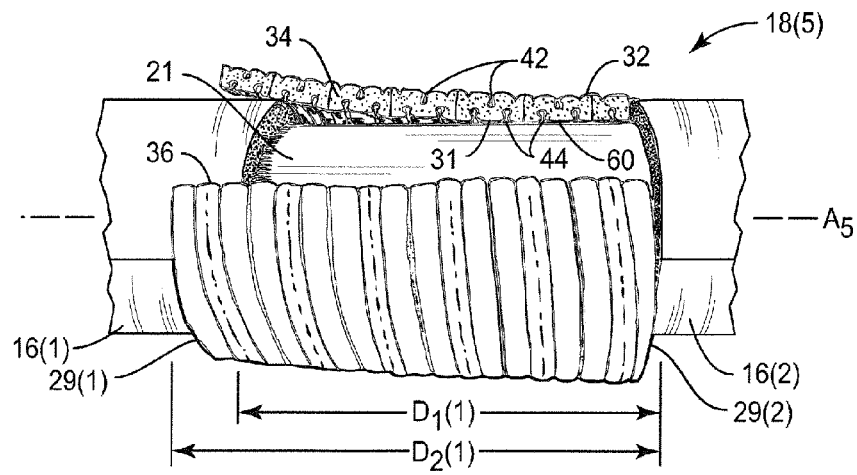
FIGS. 7A-7C depict a side view during installation, a side view after installation, and a partial perspective view of an expansion joint. respectively, which may be another example of the expansion joint of FIG. 2B.
Figure 7B:
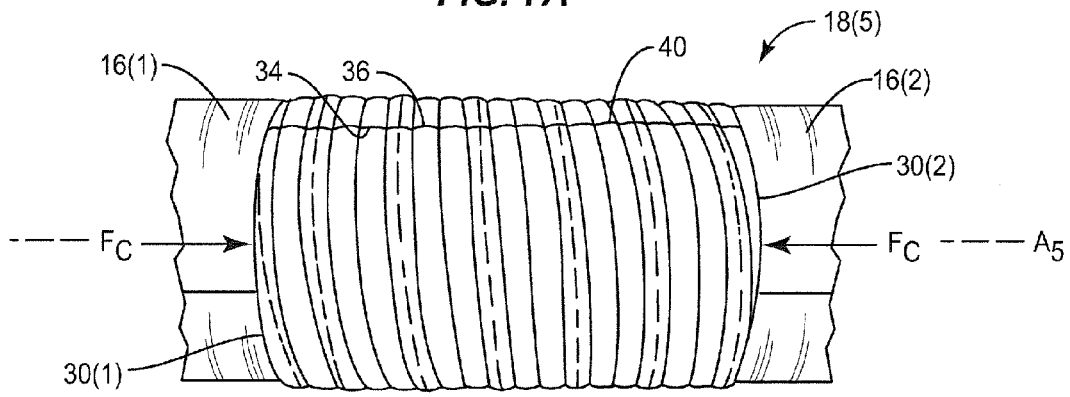
Figure 7C:
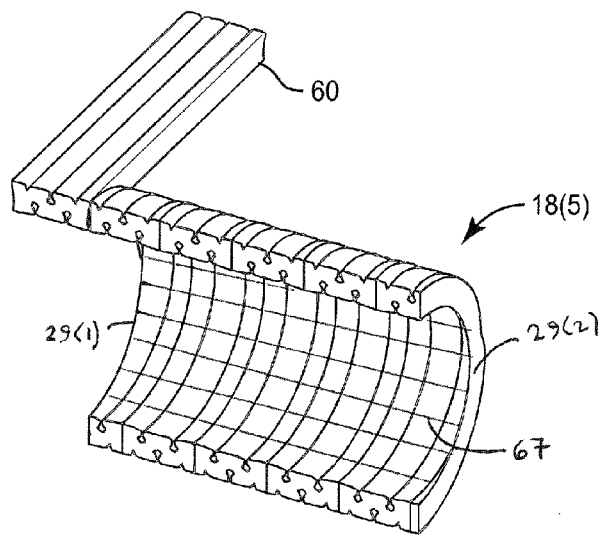

FIGS. 7A-7C depict a side view during installation, a side view after installation, and a partial perspective view of an expansion joint 18(5), which may be another example of the expansion joint 18(1). The expansion joint 18(5) may operate similar to the expansion joint 18(1) of FIG. 2B, as discussed previously. The expansion joint 18(5) may comprise a foam profile 60, for example, thermoplastic, including an internal surface 31 having inner channels 44 and an external surface 32 having outer channels 42. The foam profile 60 may be wrapped helically and thermally bonded together in the helical shape. The helical shape may be cut parallel to the center axis $A_5$ to create the first surface 34 and the second surface 36. The end surfaces 29(1), 29(2) may be created orthogonal to the center axis $A_5$ by slicing the expansion joint 18(5).

FIG. 7A depicts that the expansion joint 18(5) may include a distance $D_2(1)$ between the end surfaces 29(1), 29(2) when not installed in the distance $D_1(1)$ of gap 21 and when at the ambient temperature. The distance $D_2(1)$ may be greater than the distance $D_1(1)$ of the gap 21 at the ambient temperature. The expansion joint 18(5) may be compressed in order to be installed into the gap 21. For example, if the gap 21 has the distance $D_1(1)$ of ten (10) inches and the expansion joint 18(5) has a the distance $D_2(1)$ of twelve (12) inches, then the expansion joint 18(5) may be compressed to within ten (10) inches to fit within the gap 21. Compressing the expansion joint 18(5) having a distance $D_2(1)$ greater than the distance $D_1(1)$ allows the expansion joint 18(1) to be disposed in the gap 21 with a compression force $F_C$ (FIG. 7B). The compression force $F_C$ places the attachment members 30(1), 30(2) also under compression to provide a better seal against humidity from the ambient environment reaching the pipe 12. Further, the compression force $F_C$ allows the expansion joint 18(5) to better expand to fill the gap 21 when the gap 21 expands to a distance $D_1(2)$ (FIG. 3B) as the external surface 14 of the pipe 12 reaches the operating temperature $T_O$ so that the pipe 12 is fully insulated.

In this regard, FIG. 7A depicts the first surface 34 being installed initially in the gap 21. The outer channels 42 and inner channels 44 may be at least partially closed as the expansion joint 18(5) is installed in the gap 21. The expansion joint 18(5) may contract or be pre-compressed to within the distance $D_1(1)$ of the outer channels 42, and inner channels 44 may at least partially close. In addition, a material of the expansion joint 18(5) may also contract or be pre-compressed to help the expansion joint 18(5) more easily fit within the gap 21.

FIG. 7B shows that both the first surface 34 and the second surface 36 are installed into the gap 21, then the second attachment member 40 may attach the first surface 34 and second surface 36, and the attachment members 30(1), 30(2)

may attach the expansion joint 18(5) to the insulation members 16(1), 16(2). The attachment members 30(1), 30(2) and second attachment member 40 may be provided to the insulation system 10(1) with, for example, a heat gun and/or adhesive applicator.

FIG. 7C shows a partial perspective view of the expansion joint 18(5) comprising the foam profile 60 in a helical shape. The left side of FIG. 7C shows a straight elongated section of the foam profile 60 before entering the helical shape.

FIG. 7C also depicts that the expansion joint 18(5) may optionally include at least one second channels 67 which extend between end surfaces 29(1), 29(2). The second channels 67 may be applied to the expansion joint 18(5) with a hot wire cutter to partially cut material of the expansion joint 18(5). In this manner, the expansion joint 18(5) may be more easily stretched during installation to surround a circumference of the pipe 12.

In another embodiment for comparison, and discussed in more detail later in relation to FIGS. 17A-17B, the expansion joint 18(5) may be formed and factory compressed and/or annealed at an elevated temperature so that a pre-compression of the expansion joint 18(5) is provided, so that further compression during installation may be reduced or eliminated to make installation more convenient. In this example, when the exterior surface 14 of the pipe 12 reaches an operating temperature colder than ambient temperature, the insulation members 16(1), 16(2) may contract and therefore pull the expansion joint 18(5) to an expanded length to cover the increased gap between insulation members 16(1), 16(2). When the pipe 12 may be turned off or cycled as is common in refrigeration systems, for example, the insulation members 16(1), 16(2) may return to ambient temperature by expanding, and the expansion joint 18(5) may contract to an original pre-compressed state.

Figure 8:
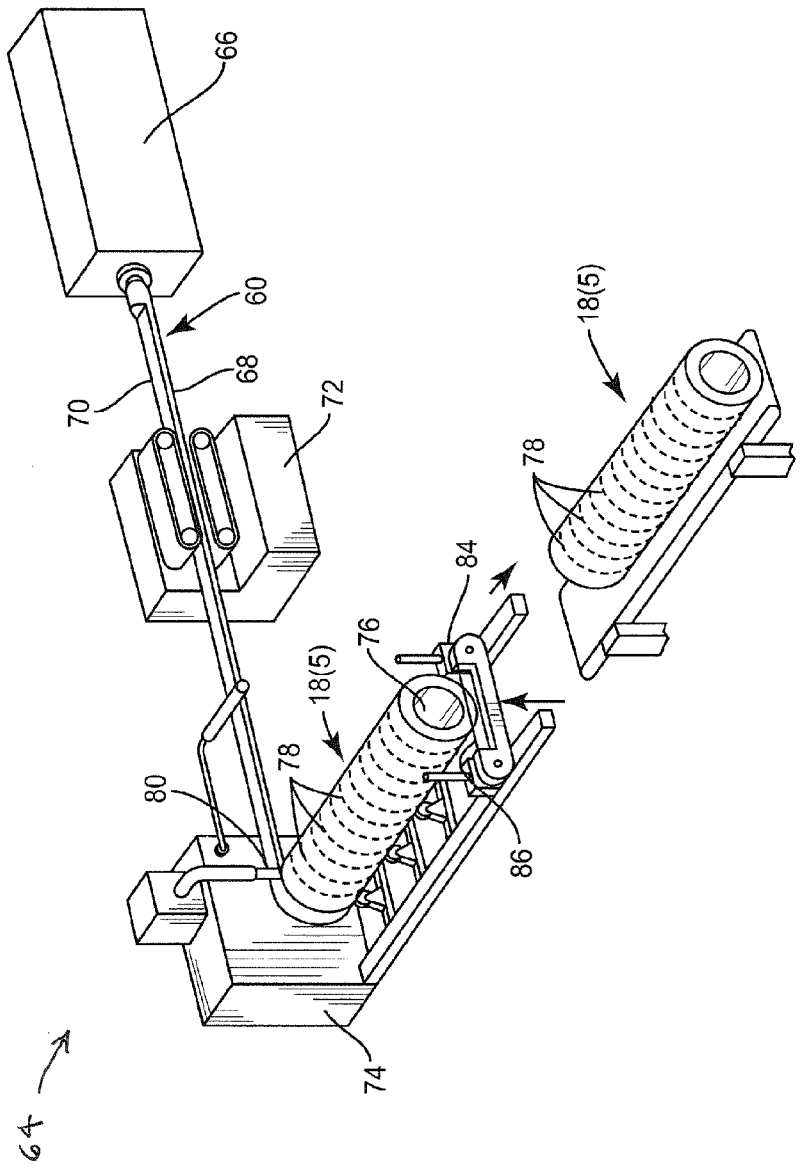
FIG. 8 shows an exemplary product forming system in the prior art that may be utilized for forming the expansion member of FIG. 7C.

FIG. 8 shows an exemplary product forming system 64 in the prior art for forming the expansion joint 18(5). In this embodiment, product forming system 64 comprises an extruder 66 having a generally conventional configuration which produces the foam profile 60 in any desired configuration having side edges 68 and 70. Puller 72 may be employed for continuously drawing the foam profile 60 from extruder 66 and feeding the foam profile 60 to a tube forming machine 74. In employing the product forming system 64, any polyolefin material may be used to form the foam profile 60. However, the preferred polyolefin material comprises one or more selected from the group consisting of polystyrenes, polyolefins, polyethylenes, polybutanes, polybutylenes, polyurethanes, thermoplastic elastomers, thermoplastic polyesters, thermoplastic polyurethanes, polyesters, ethylene acrylic copolymers, ethylene vinyl acetate copolymers, ethylene methyl acrylate copolymers, ethylene butyl acrylate copolymers, ionomers polypropylenes, and copolymers of polypropylene.

The tube forming machine 74 is constructed for receiving the foam profile 60 on rotating mandrel 76 in a manner which causes the foam profile 60 to be wrapped around the rotating mandrel 76 of tube forming machine 74 continuously, forming a plurality of helically-wrapped convolutions 78 in a side-to-side abutting relationship. In this way, the incoming continuous feed of the foam profile 60 may be automatically rotated about mandrel 76 in a generally spiral configuration, causing side edge 68 of the foam profile 60 to be brought into abutting contact with the side edge 70 of previously received and helically-wrapped convolution 78. By bonding the side edges 68, 70 to each other at this juncture point, the expansion joint 18(5) may be formed substantially cylindrical and hollow. In order to provide integral bonded engagement of side edge 68 of the foam profile 60 with the side edge 70 of the helically-wrapped convolution 78, a bonding fusion head 80 may be employed. If desired, the bonding fusion head 80 may comprise a variety of alternate constructions in order to attain the desired secure affixed bonded inter-engagement of the edge 68 with the side edge 70. In the preferred embodiment, the bonding fusion head 80 employs heated air.

By delivering heated air to the bonding fusion head 80, a temperature of the bonding fusion head 80 is elevated to a level that enables the side edges 68, 70 of the foam profile 60 and the helically-wrapped convolution 78 which contacts the bonding fusion head 80, to be raised to their melting point and thus may be securely fused or bonded to each other. The bonding fusion head 80 may be positioned at the juncture zone at which side edge 68 of the foam profile 60 is brought into contact with the side edge 70 of the previously received and the helically-wrapped convolution 78. By causing the bonding fusion head 80 to simultaneously contact the side edge 68 and the side edge 70 of these components of the foam profile 60, the temperature of the surfaces is raised to the melting point thereof, thus enabling the contact of the side edge 68 of the foam profile 60 which is incoming to be brought into direct contact with side edge 70 of a first one of the helically-wrapped convolution 78 in a manner which causes the surfaces to be intimately bonded to each other. Although heated air is preferred for this bonding operation, alternate affixation means may be employed. One such alternative is the use of heated adhesives applied directly to the side edges 68, 70. A cutting system 84, including a heated wire 86, may cut the expansion joint 18(5) at an angle, for example, perpendicular, to the center axis of the mandrel 76. In this manner, the expansion joint 18(5) may be created.

There are other examples of expansion joints that may be provided to ensure that the gap 21 between the insulation members 16(1), 16(2) is fully insulated. FIGS. 9A-9D depict views of another embodiment of an expansion joint 18(6) which may illustrate another example of the expansion joint 18(1). The expansion joint 18(6) may operate similarly to the expansion joint 18(1) of FIG. 2B, as discussed previously and so only the differences will be discussed for clarity and conciseness. The expansion joint 18(6) may comprise a first insulation section 88 and a second insulation section 90 embedded within the first insulation section 88 in a helical shape. The helical shape enables the first insulation section 88 and the second insulation section 90 to be efficiently combined with each other in a single embodiment of the expansion joint 18(6). In this manner, the expansion joint 18(6) may include performance characteristics of both the first insulation section 88 and the second insulation section 90.

To take advantage of a benefit of having multiple performance characteristics, the first insulation section 88 may comprise a different material than the second insulation section 90. The first insulation section 88 may be more stiff and a higher density to provide strength to the expansion joint 18(6). The second insulation section 90 may be made of a more resilient and less stiff material than the first insulation section to make it easier to compress the expansion joint 18(6) during installation within the gap 21.

FIGS. 9A-9B are perspective views of the expansion joint 18(6) in an uncompressed state having an exemplary length of $D_3$ of fourteen (14) inches long and in a compressed state having an exemplary length $D_4$ of eleven (11) inches long when subject to a compressive force $F_C$, respectively. Most or all of the initial contraction may occur in the second insulation section 90 as shown when FIGS. 9A and 9B are compared. FIG. 9C is a side view of the expansion joint 18(6) of FIG. 9A in an uncompressed state, illustrating the helical shape of the first insulation section 88 and the helical shape of the second insulation section 90.

FIGS. 9D and 9E are perspective views of the expansion joint 18(6) illustrating end surfaces 29(1), 29(2) of the expansion joint 18(6) after cutting, as part of an exemplary manufacturing process. The end surfaces 29(1), 29(2) may comprise a portion 92 of the first insulation section 88 and a portion 94 of the second insulation section 90. The portion 92 and the portion 94 form a planar surface at the end surfaces 29(1), 29(2), which may provide a continuous surface to fully abut against the abutment surfaces 22(1), 22(2) of the insulation members 16(1), 16(2), respectively.

Figure 10A:
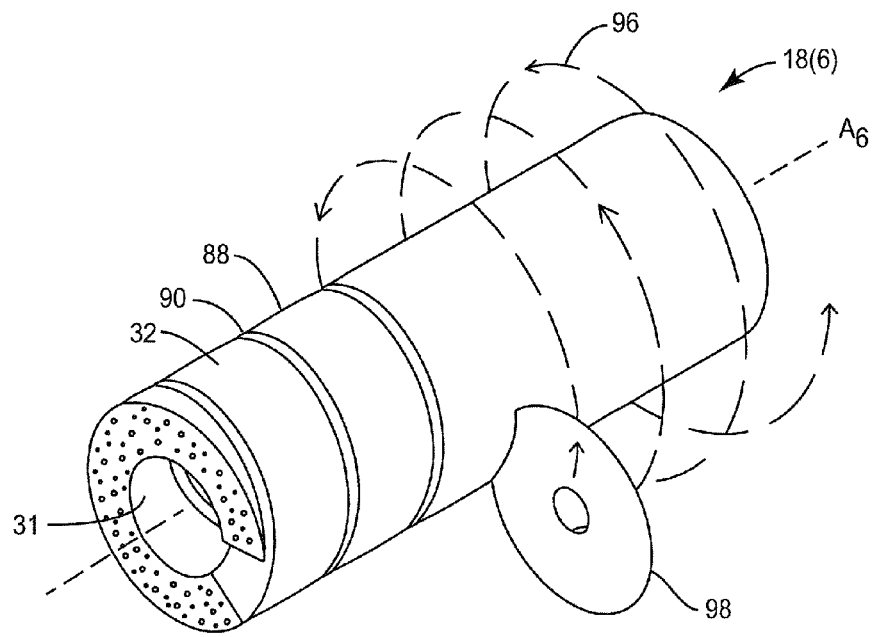
FIGS. 10A-10C depict an exemplary process for creating the expansion joint of FIG. 9A.
Figure 10B:
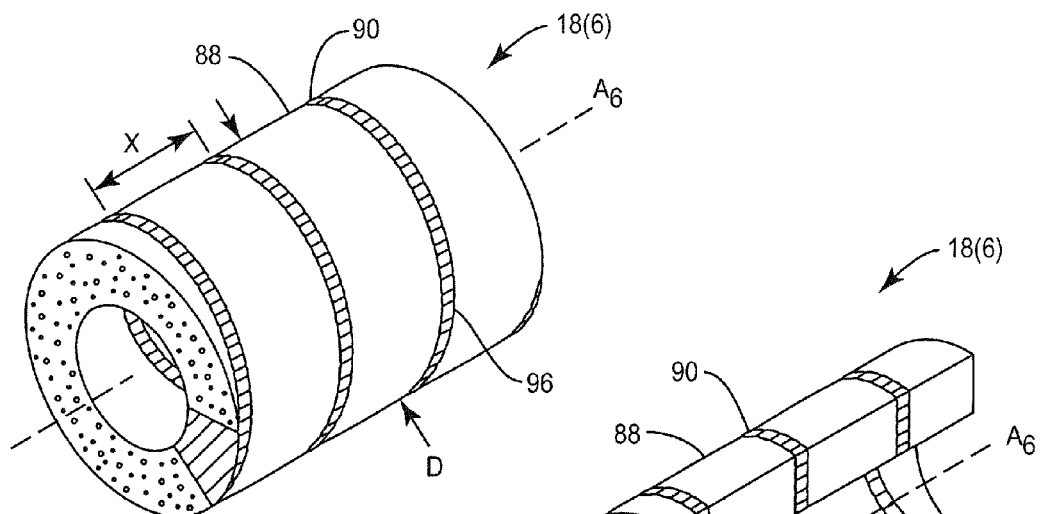
Figure 10C:
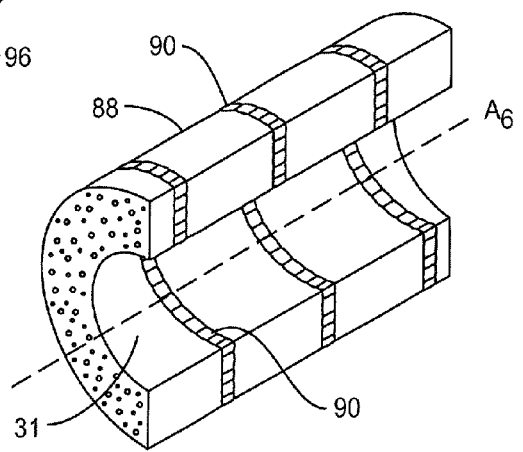
Figure 11:
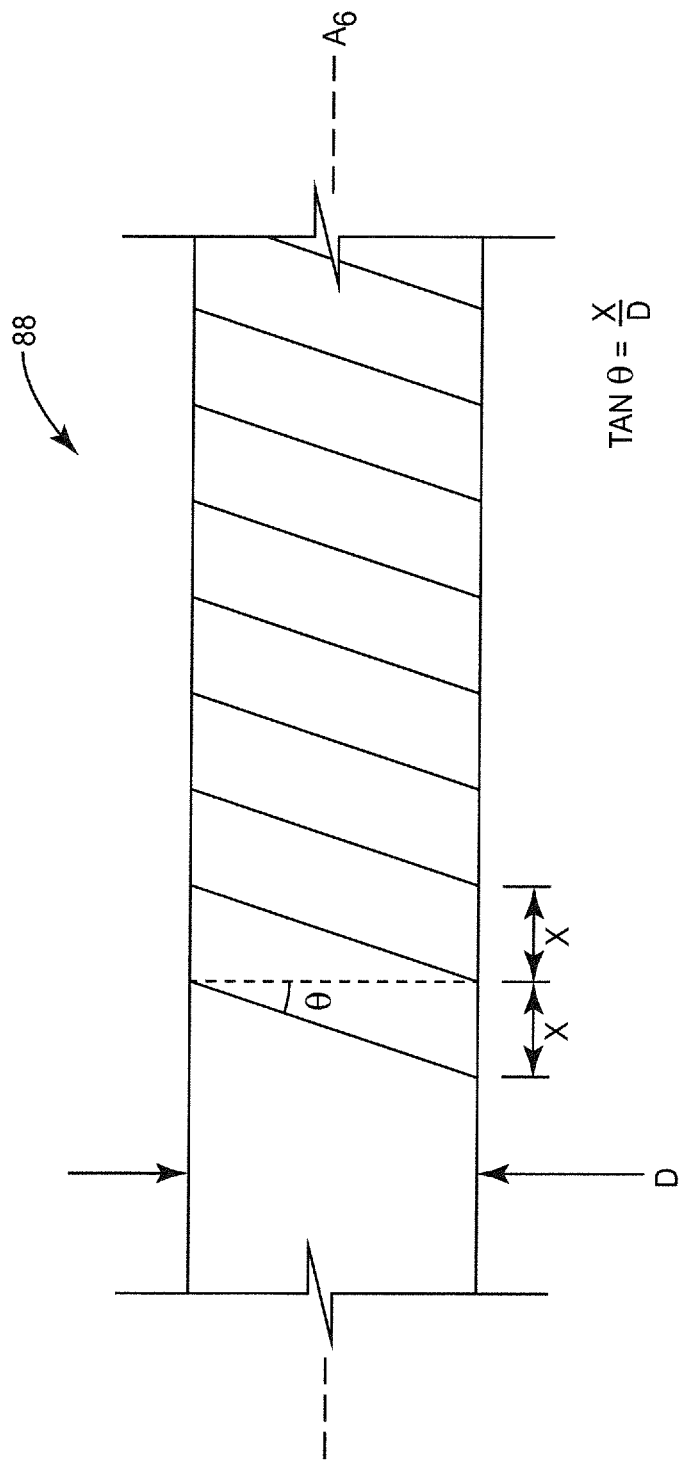
FIG. 11 depicts a side view of the first insulation section showing a relationship between a diameter, a distance parallel to a center axis of a spiral convolution, and a pitch angle.

FIGS. 10A-10C depict an exemplary process for creating the expansion joint 18(6). First, the first insulation section 88 may be cut fully through from the external surface 32 to the internal surface 31 along a helical path 96 with a cutter 98, as shown in FIG. 10A. The cutter 98 may be, for example, a rotary saw. A tangent to any point along the helical path 96 makes a pitch angle theta ($\theta$) (FIG. 11) with the center axis $A_6$ of the expansion joint 18(6). The pitch angle theta ($\theta$) may be calculated as the arctangent of X/D. In this calculation, X may be a pitch distance X parallel to the center axis $A_6$ of spiral convolution, including a contribution from the first insulation section 88 and the second insulation section 90. Further, D may be the diameter D of the first insulation section 88 as shown in FIG. 10B and FIG. 11.

Next, as shown in FIG. 10B, the second insulation section 90 is disposed within the helical path 96. FIG. 10C depicts a partial perspective view of the expansion joint 18(6) showing the second insulation section 90 in the internal surface 31, which allows longitudinal expansion along the center axis $A_6$.

The relationship between diameter D and helical pitch angle ($\theta$) for a constant pitch distance X is best shown by visual examples. FIGS. 12A and 12B are perspective views of one example of a first insulation section 88A and another example of a first insulation section 88B having helical pitch angles theta ($\theta_1$, $\theta_2$) as a function of diameters $D_1$, $D_2$, respectively, for helical paths 96A, 96B having identical values of the pitch distance X. As the pitch distance X remains constant, the pitch angle theta ($\theta_2$) will be larger for FIG. 12B than the pitch angle theta ($\theta_1$) of FIG. 12A because the diameter $D_2$ is smaller than $D_1$ which creates a larger ratio X/D and thereby a larger arctangent (X/D). The pitch angle theta ($\theta$) may be preferably less than twenty (20) degrees to maximize contraction of the expansion joint 18(6) along the center axis $A_6$. Consequently, the pitch distance X of the foam profile 60 may need to be reduced to result in a small pitch angle theta ($\theta$) less than twenty (20) degrees, for examples of the pipes 12 having relatively small dimensions of the diameter D.

Now that the concept of the first insulation section 88 and the second insulation section 90 have been discussed in the helical shapes that are combined to form the expansion joint 18(6), other examples of expansion joints are possible. In this regard, expansion joints 18(5), 18(7) having a single profile and dual profiles, respectively, are now discussed.

Figure 13A:
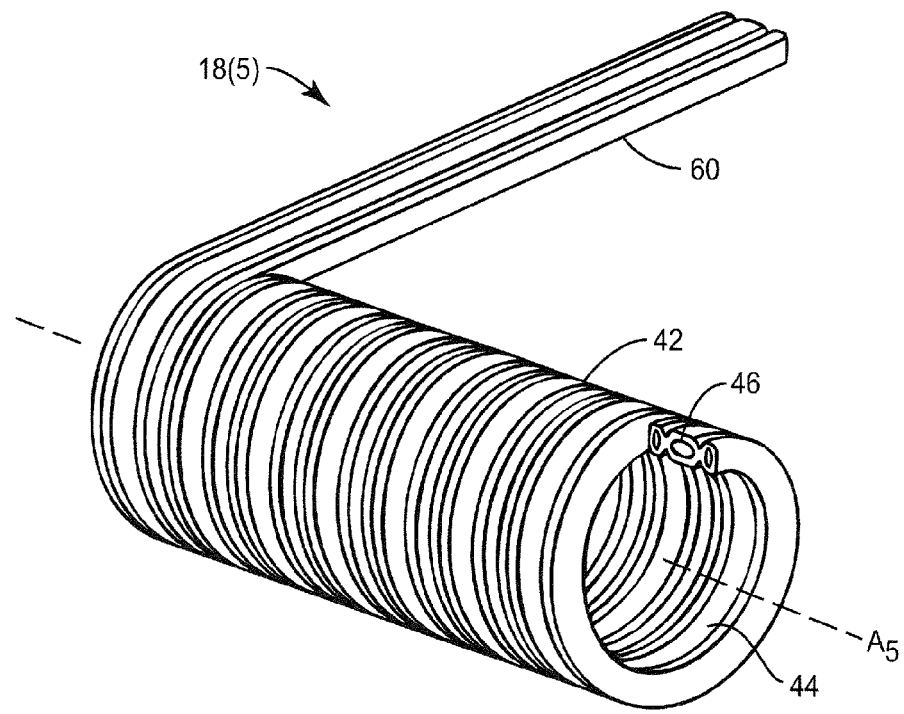
FIGS. 13A and 13B are top perspective views of one embodiment of an expansion joint including a single foam profile, and another expansion joint including a dual profile.
Figure 13B:
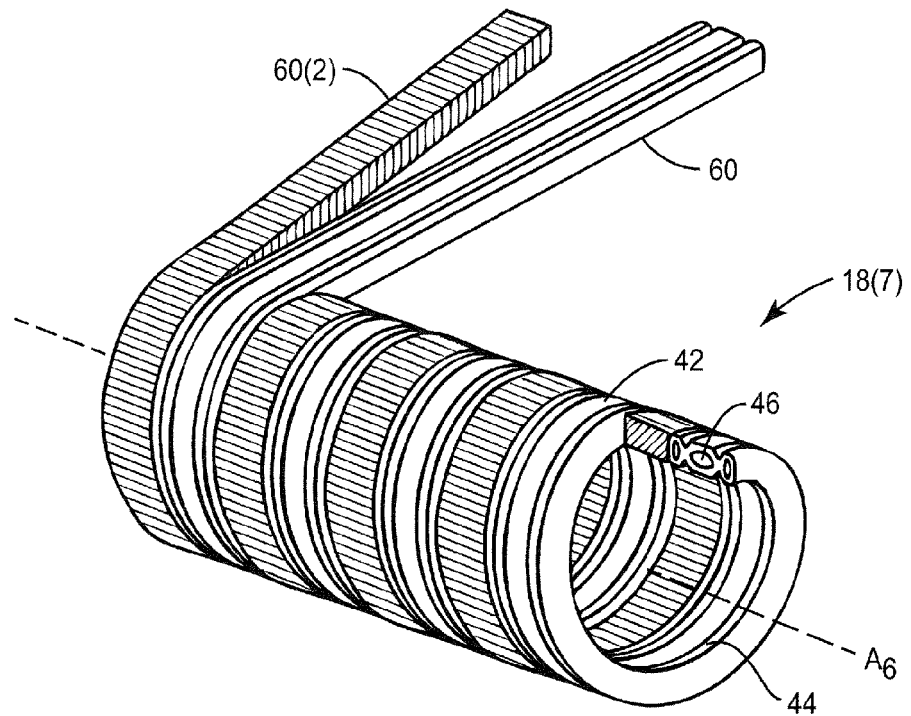

FIG. 13A is a view of the expansion joint 18(5) formed with the product forming system 64 of FIG. 8. The expansion joint 18(5) may comprise the single foam profile 60. The single foam profile 60 may be relatively complex and engineered to give precise compression characteristics with shaped ones of the inner passageway 46, the outer channels 42, and the inner channels 44. FIG. 13B depicts an expansion joint 18(7) which may illustrate another example of the expansion joint 18(1). The expansion joint 18(7) may operate similar to the expansion joint 18(1) of FIG. 2B, as discussed previously, and so only differences will be discussed for clarity and conciseness.

The expansion joint 18(7) may comprise the single foam profile 60 shown in FIG. 13A and a second foam profile 60(2). The foam profile 60 may include the outer channels 42, the inner channels 44, and optionally the at least one inner passageway 46, which may reduce the stiffness of the expansion joint 18(7). The reduction of stiffness may allow the expansion joint 18(7) to more easily fit within the gap 21 between the insulation members 16(1), 16(2) of FIG. 2A. The second foam profile 60(2) may be denser than the foam profile 60(2) to provide strength to the expansion joint 18(7). In this manner, the expansion joint 18(7) may provide the compression performance needed to provide full insulation between the insulation members 16(1), 16(2) of FIG. 2B during thermal cycling of the insulation members 16(1), 16(2), and may also provide strength needed, for example, for rugged applications such as an oil pipeline operating all year long that is located, for example, north of the Arctic Circle.

FIGS. 14A-14B depict the expansion joint 18(7) after thermal bonding between the foam profile 60 and the second foam profile 60(2) and after cutting to make end surfaces 29A(1), 29A(2) orthogonal to the center axis $A_7$. The end faces 29A(1), 29A(2) comprise a portion 100 of the foam profile 60 and a portion 102 of the second foam profile 60(2). The portion 100 may be non-uniform around the end surfaces 29A(1), 29A(2) because of the outer channels 42, the inner channels 44, and the at least one inner passageway 46. FIG. 14C depicts a perspective view of the expansion joint 18(7) disposed around the pipe 12.

Figure 15A:
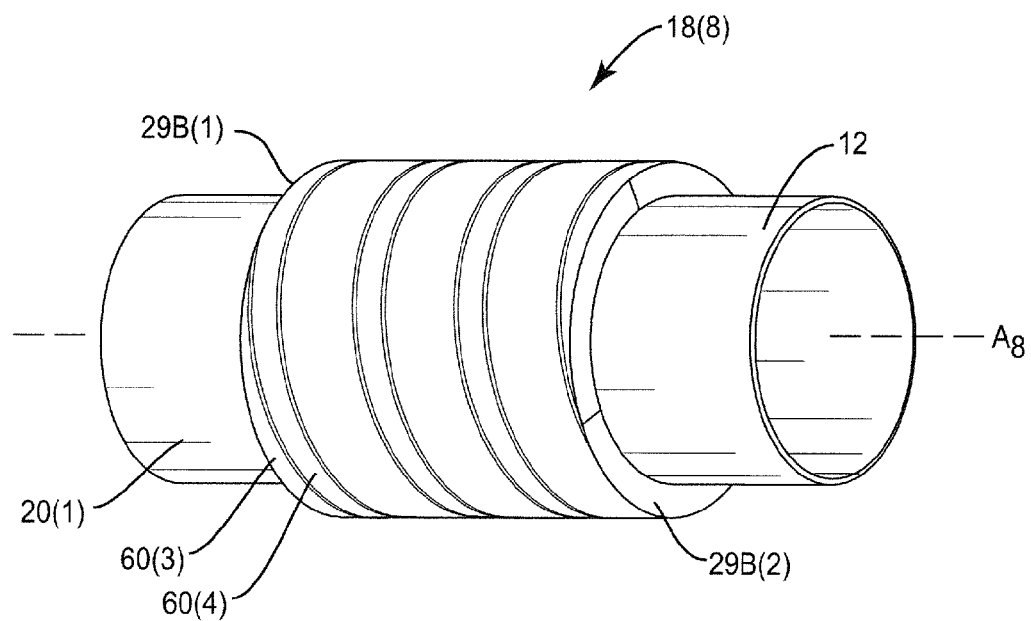
FIG. 15A is a perspective view of another example of an expansion joint installed around the pipe, depicting multiple foam profiles creating end faces with smooth and uniform end faces.
Figure 15B:
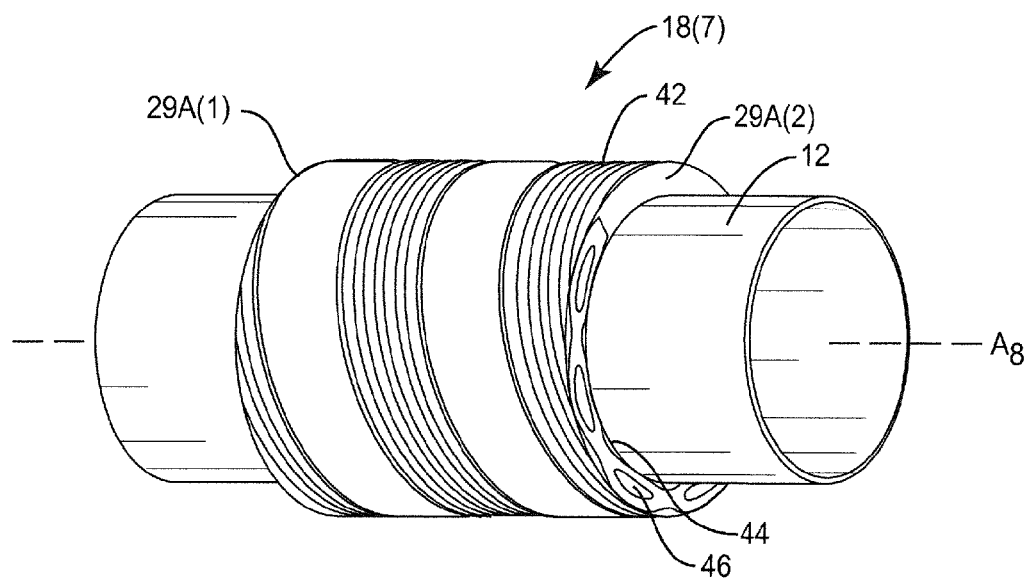
FIG. 15B depicts a perspective view of the expansion joint of FIG. 14C, illustrating the end faces that are different from the end faces in FIG. 15A.
Figure 15C:
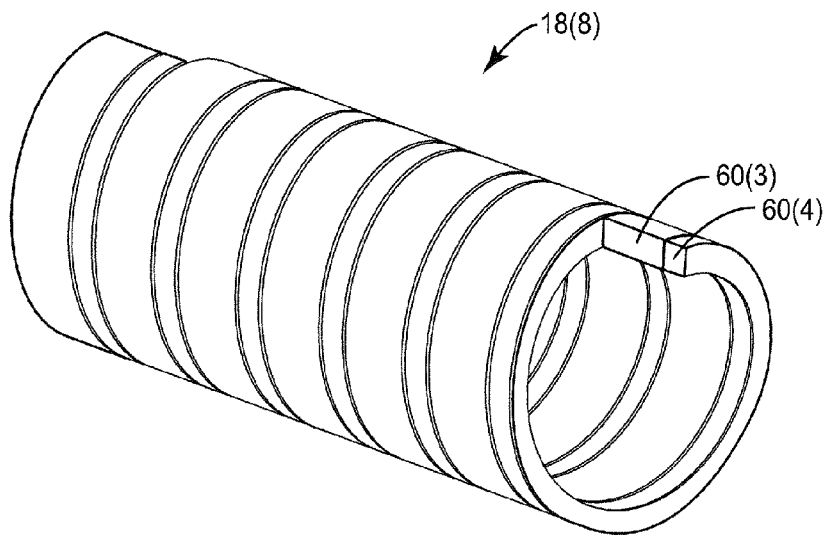
FIGS. 15C-15E are additional perspective views of the expansion joint of FIG. 15A including before cutting to form the end faces, after forming the end faces, and after installation on the pipe, respectively.
Figure 15D:
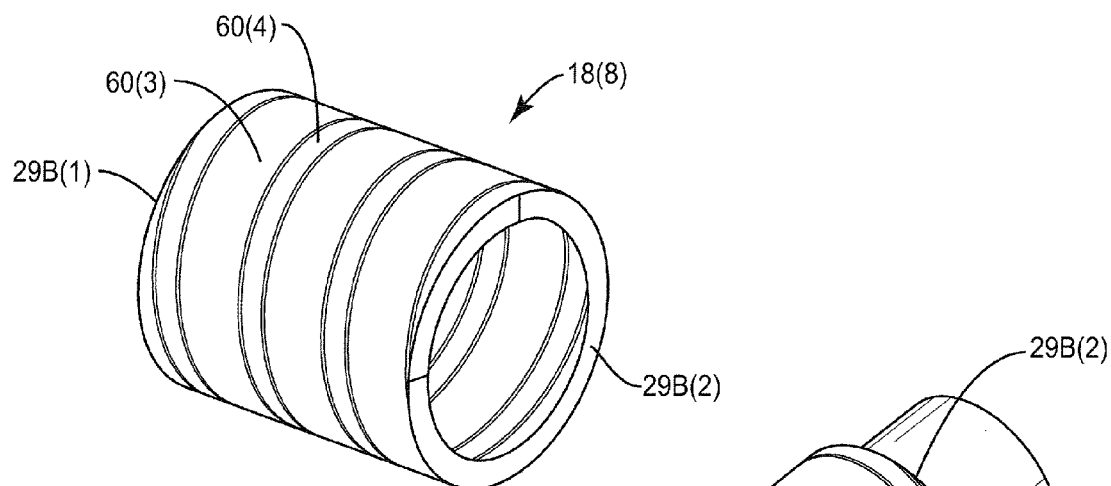
Figure 15E:
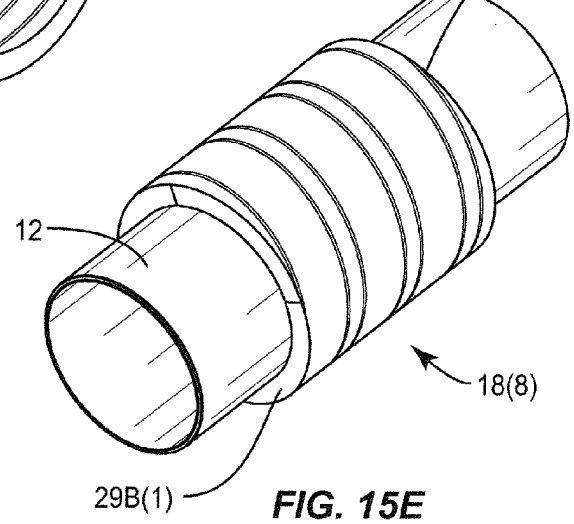

FIG. 15A is a perspective view of an expansion joint 18(8) which may be another example of the expansion joint 18(1). The expansion joint 18(8) may operate similar to the expansion joint 18(1) of FIG. 2B, as discussed previously, and so only differences will be discussed for clarity and conciseness. The expansion joint 18(8) may comprise a foam profile 60(3) and a foam profile 60(4). Neither the foam profile 60(3) or the foam profile 60(4) include outer channels 42, inner channels 44, or inner passageways 46. As a result, end surfaces 29B(1), 29B(2) are smooth and uniform about the center axis $A_8$. Smooth and uniform examples of the end surfaces 29B(1), 29B(2) may better insulate the gap 21 between the insulation members 16(1), 16(2) that is shown in FIG. 2B. FIG. 15B depicts a perspective view of the expansion joint 18(7) of FIG. 14C to present the end faces 29A(1), 29A(2) of FIG. 15B for comparison, which are not smooth and have openings related to the inner channels 44, the outer channels 42, and the inner passageways 46. FIGS. 15C-15E are additional perspective views of the expansion joint 18(8) of FIG. 15A, including before cutting to form the end faces 29B(1), 29B(2), after forming the end faces 29B(1), 29B(2), and after installation on the pipe 12, respectively. In applications where the expansion joint 18(7) may need to be compressed during installation on a pipe 12, then the reduced stiffness may be achieved with geometry and/or material selection.

Figure 16A:
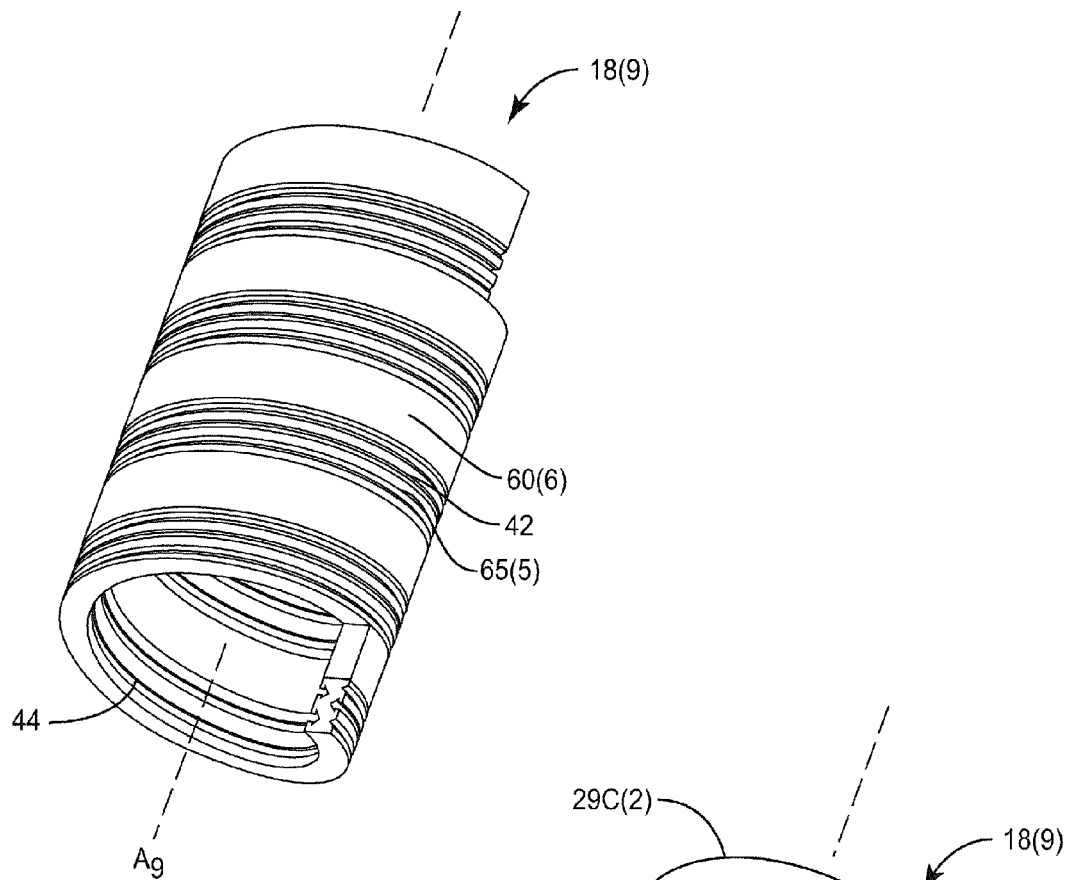
FIGS. 16A and 16B are perspective views of another embodiment of an expansion joint before end faces are formed and after the end faces are formed, respectively, illustrating smoother end faces in the absence of the inner passageways.
Figure 16B:
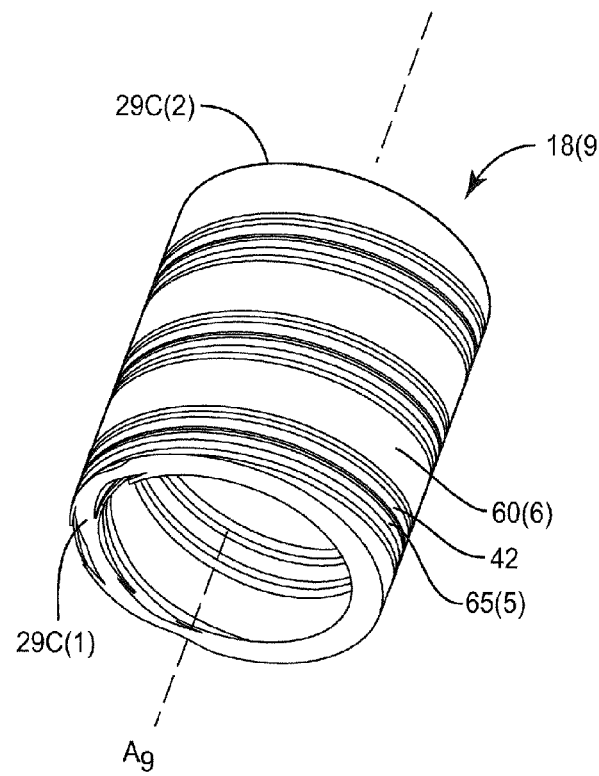

FIGS. 16A and 16B are perspective views of another embodiment of an expansion joint 18(9) before end faces 29C(1), 29C(2) are formed, and after the end faces 29C(1), 29C(2) are formed, respectively. The expansion joint 18(9) may operate similar to the expansion joint 18(1) of FIG. 2B, as discussed previously, and so only differences will be discussed for clarity and conciseness. The expansion joint 18(9) may comprise a foam profile 60(5) and a foam profile 60(6). The foam profile 60(5) may include outer channels 42 and inner channels 44, but is free of the inner passageways 46. As a result of not having inner passageways 46, the end surfaces 29C(1), 29C(2) are relatively smooth and uniform about the center axis $A_9$. Smoother and more uniform examples of the end surfaces 29C(1), 29C(2) of the expansion joint 18(9) may be better able to uniformly abut against the insulation members 16(1), 16(2) of FIG. 2A, compared to the less uniform examples of the end faces 29A(1), 29A(2) of the expansion joint 18(7). In this regard, the expansion joint 18(9) may be better able to fully insulate the gap 21 between the insulation members 16(1), 16(2) shown in FIG. 2A.

Figure 17A:
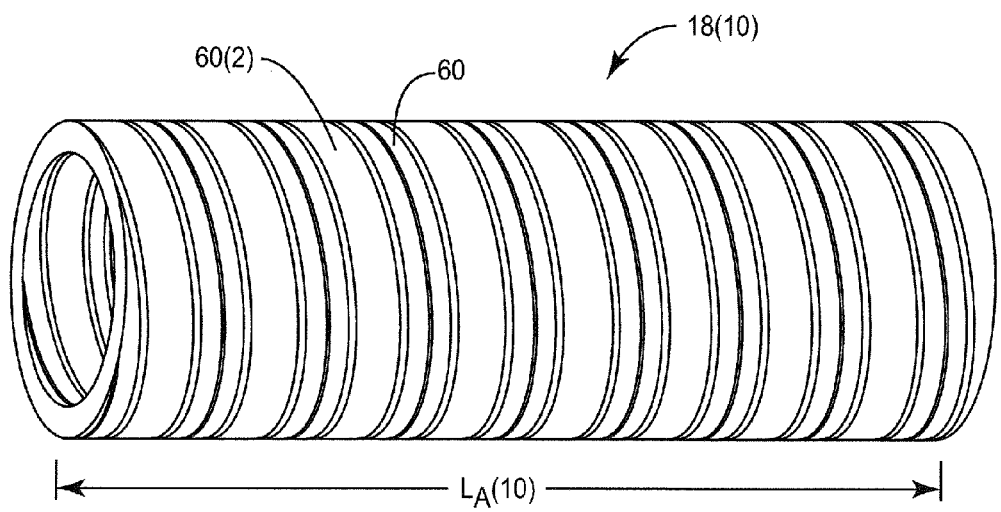
FIGS. 17A and 17B are side views of another example of an expansion joint which is compressed to close or substantially close the outer channels, inner channels, and inner passageways and is then annealed to hold that compressed position.
Figure 17B:
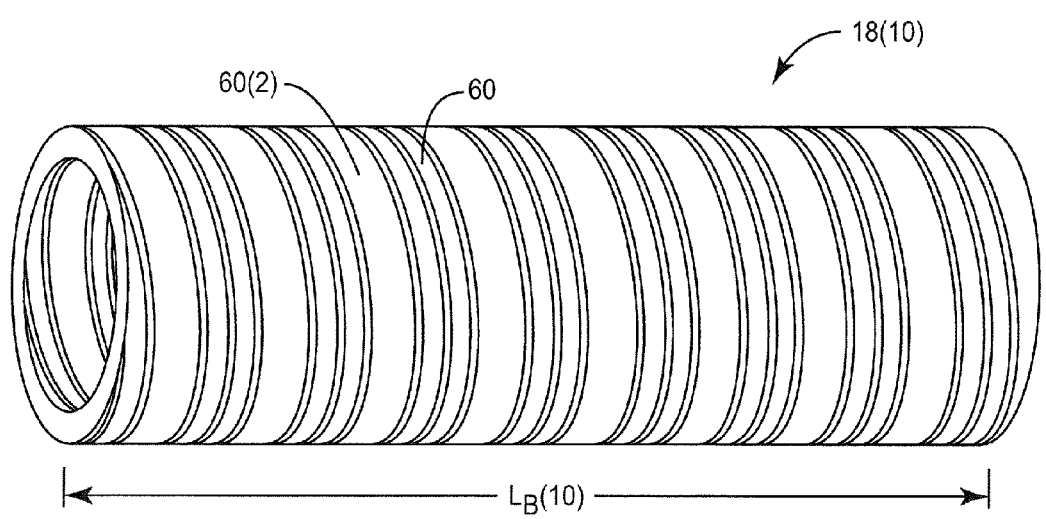

In another example shown in FIGS. 17A and 17B, an expansion joint 18(10) may be formed that may be factory compressed and annealed at an elevated temperature, so that a compression of the expansion joint 18(10) during installation around the pipe 12 may be reduced or eliminated to make installation more convenient. In this example, when the exterior surface 14 of the pipe 12 reaches an operating temperature, the insulation members may pull on the expansion joint to an expanded length during expansion to cover the increased gap 21 between the insulation members 16(1), 16(2). When operation of the pipe 12 may be turned off, the insulation members 16(1), 16(2) (see FIG. 2A) may expand again and the expansion joint 18(10) may contract to an original, pre-compressed state.

Figure 17C:
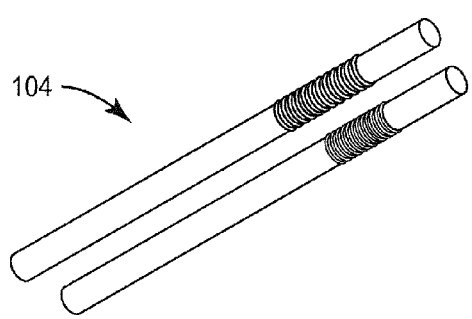
FIG. 17C is a perspective view of a soda straw after being pulled to an elongated state and a soda straw compressed back to its original state, respectively, illustrating a mechanical analogy to the expansion joint of FIGS. 17A-17B.

In this regard, the factory-compression may be added to an expansion joint to reduce the requirement to compress the expansion joint during installation. FIG. 17A-17B are side views of an expansion joint 18(10), which may another example of the expansion joint 18(1). The expansion joint 18(10) may operate similarly to the expansion joint 18(1) of FIG. 2B, as discussed previously, thus only the difference will be discussed for clarity and conciseness. Prior to installation onto a pipe 12, the expansion joint 18(7) shown in FIG. 14C may be fully compressed parallel to the center axis $A_7$ to a length $L_A(10)$ so that any and all outer channels 42, inner channels 44, and inner passageways 46 are closed. Then the expansion joint 18(7) may be placed in an annealing oven at an elevated temperature to thermally form the expansion joint 18(7) in that position to form expansion joint 18(10) of FIGS. 17A-17B. The expansion joint 18(10) may be installed within the gap 21 without requiring compression. For example, if the gap 21 is ten (10) inches long, then the expansion joint 18(10) which is also ten (10) inches long in length $L_A(10)$ may be installed and attached to the abutment surfaces 22(1), 22(2) of the insulation members 16(1), 16(2) with the attachment members 30(1), 30(2). When the external surface 14 of the pipe 12 reaches the operating temperature $T_O$, then the insulation members 16(1), 16(2) may contract and the gap 21 may increase to the distance $D_1(2)$. However, the attachment members 30(1), 30(2), with the assistance of fasteners, may pull the expansion joint 18(10) to fill the gap 21 and maintain insulation within the gap 21. FIG. 17B shows the expansion joint 18(10) pulled to an expanded length $L_B(10)$ as would be experienced in operation to fill the gap 21. The pulling to expand the expansion joint 18(10) may be analogous to pulling a flexible example of a soda straw 104 to an elongated position as shown in FIG. 17C. As the pipe 12 eventually reaches ambient temperature, then the insulation members 16(1), 16(2) in FIG. 2A would expand and the expansion joint 18(10) would contract to the distance $D_1(1)$ in FIG. 2A.

Figures 18A, 18B:
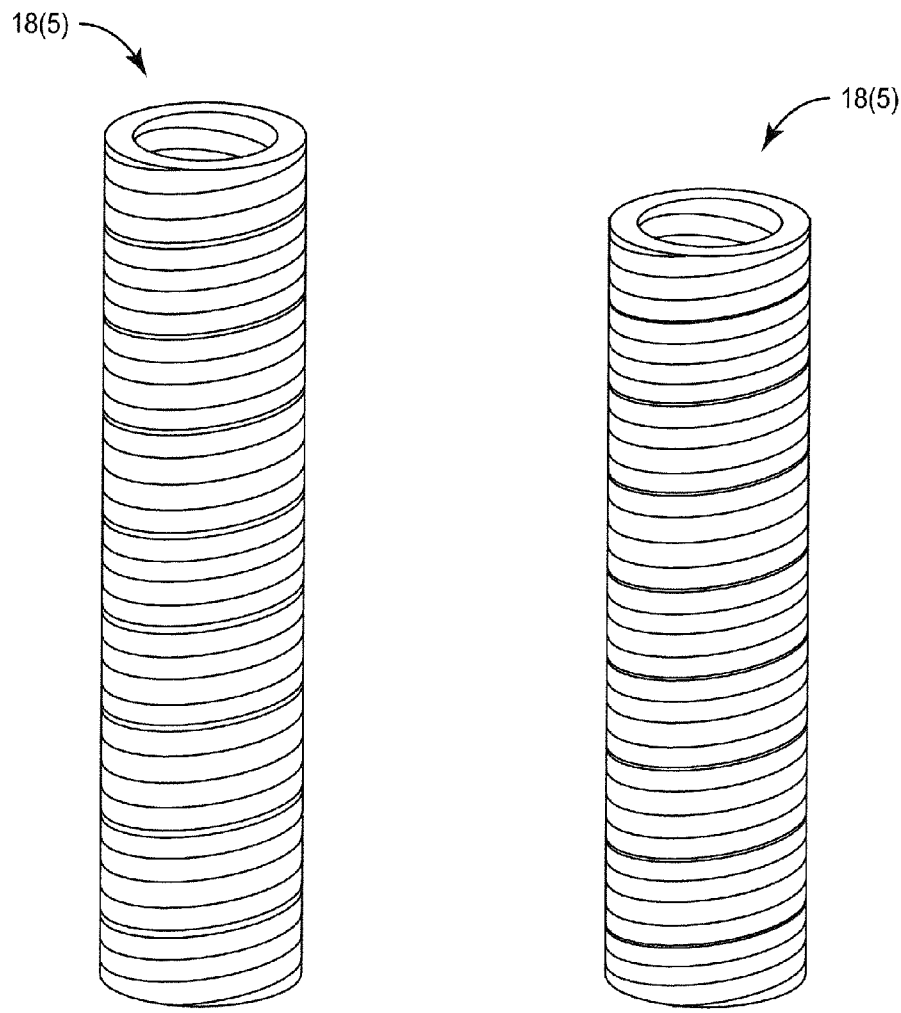
FIGS. 18A and 18B are perspective views of the expansion joint shown in FIG. 7A in an expanded and a compressed state, respectively, illustrating the expansion joint.
Figure 18C:
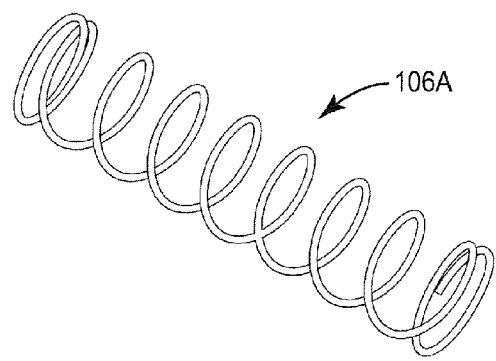
FIG. 18C is a perspective view of a metal spring, which is a mechanical analogy to the expansion joint of FIG. 18A.
Figure 19:
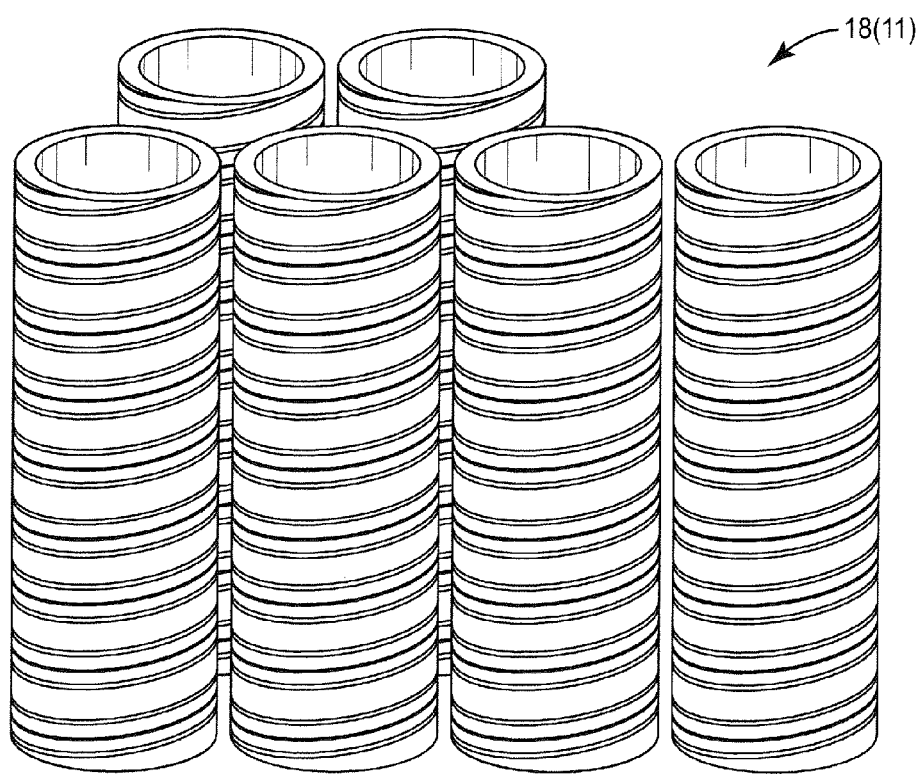
FIG. 19 is a perspective view of expansion joints formed by annealing the expansion joint of FIG. 14B in a compressed state.

Other examples of expansion joints are possible. As a comparison, FIGS. 18A-18B depict perspective views of the expansion joint 18(5) shown in FIG. 7A in an expanded and a compressed state, respectively. The expansion joint 18(5) may be mechanically analogized to a helical spring 106A, which may be metal, as shown in FIG. 18C wherein the expansion joint 18(5) pushes against the insulation members 16(1), 16(1) even when the pipe 12 is at ambient temperature, because the expansion joint 18(5) has a natural length $D_2(1)$ longer than the distance $D_1(1)$ of the gap 21.

It is noted that prior to installation onto a pipe 12, the expansion joint 18(7) shown in FIG. 14B may be partially compressed parallel to the center axis $A_7$ so that any and all outer channels 42, inner channels 44, and inner passageways 46 are partially closed. Then the expansion joint 18(7) may be placed in an annealing oven at an elevated temperature to thermally form the expansion joint 18(7) in that position to form an expansion joint 18(11), as shown in a perspective view of a group of the expansion joints 18(11) in FIG. 19. The expansion joint 18(11) is installed within the gap 21 with minimal compression. For example, if the gap 21 is ten (10) inches long, then the expansion joint 18(11) of eleven (11) inches long may be installed and attached to the abutment surfaces 22(1), 22(2) of the insulation members 16(1), 16(2) with the attachment members 30(1), 30(2). When the external surface 14 of the pipe 12 reaches the operating temperature $T_O$, then the insulation members 16(1), 16(2) may contract and the gap 21 may increase to the distance $D_1(2)$. However, the attachment members 30(1), 30(2) may pull the expansion joint 18(10) to fill the gap 21 and maintain insulation within the gap 21.

Figure 20A:
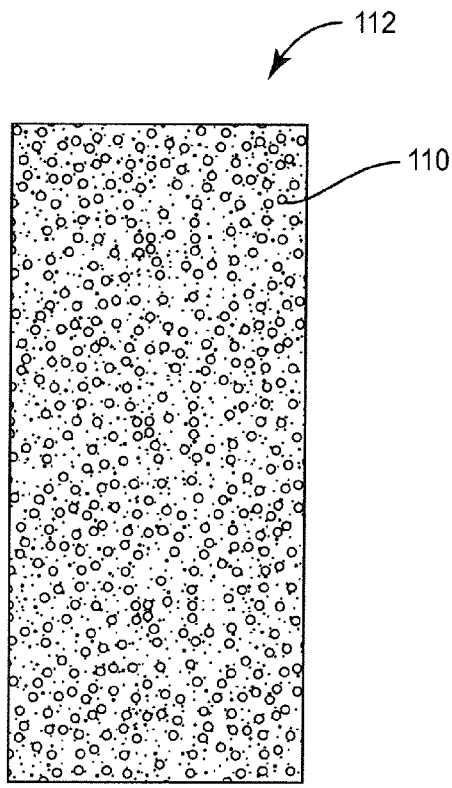
FIG. 20A is an exemplary foam member with pinning or puncturing holes added to provide enhanced compressibility, illustrating a technique to more easily change a shape of expansion joints to fill the gap between the insulation members of FIG. 2A.
Figure 20B:
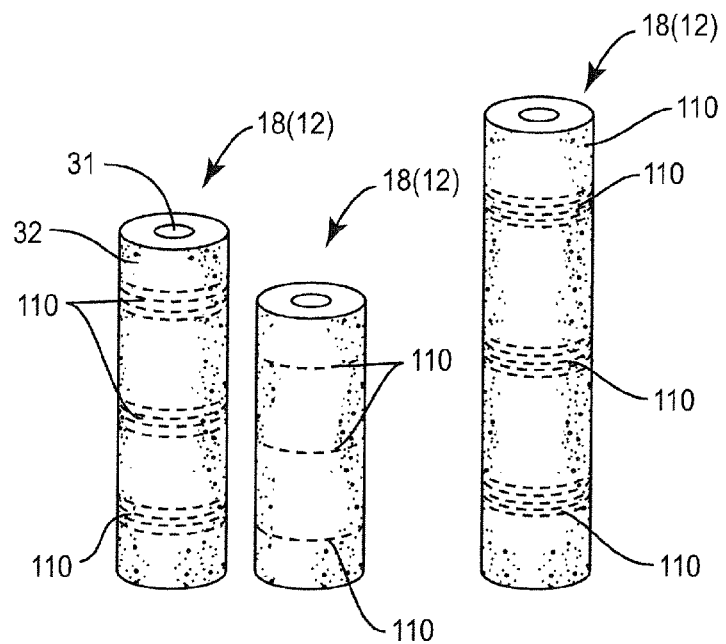
FIG. 20B is a perspective view of exemplary expansion joints comprising the pinning or the puncturing holes of FIG. 20A from the external surface to a predetermined depth of the expansion joint, providing enhanced ability for the shape of expansion joints to change to thereby fill the gap between the insulation members of FIG. 2A.

Other examples of an expansion joint are possible. FIG. 20A shows that pinning or puncturing holes 110 may be added to a foamed polyolefin member 112 to provide enhanced compressibility. The foamed polyolefin member 112 may contain material used to make any of the earlier mentioned expansion joints. Pinning or puncturing holes 110 may be added to any one of the previous examples of expansion joints to form an elongated joint 18(12) with enhanced compressibility by reducing stiffness or resistance to compression or tension, as shown in FIG. 20B. The pinning or puncturing holes 110 may extend into the expansion joint 18(12) from the external surface 32 to a predetermined depth of at least ten (10) percent of a thickness of the expansion joint 18(12). The enhanced compressibility may enable the attachment members 30(1), 30(2) to more easily move the elongated joint 18(12) to fill the gap 21.

Figure 21A:
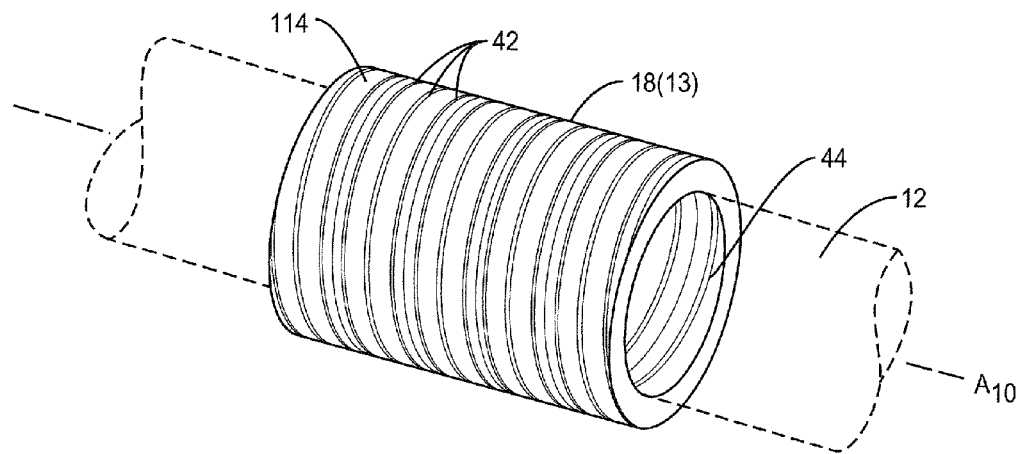
FIGS. 21A-21C are a perspective view, a partial cutaway perspective view, and a full cutaway view, respectively, of an exemplary expansion joint installed upon the pipe, the expansion joint comprising a helical spring disposed within a foam expansion body.
Figure 21B:
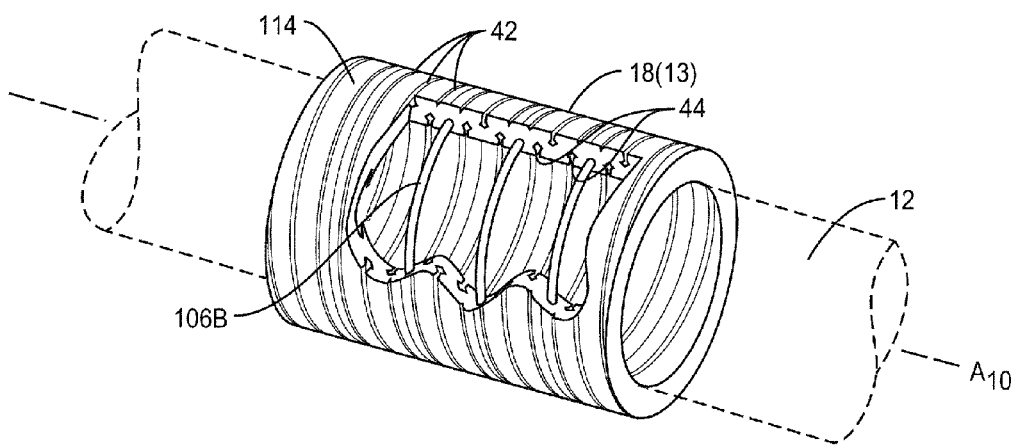
Figure 21C:
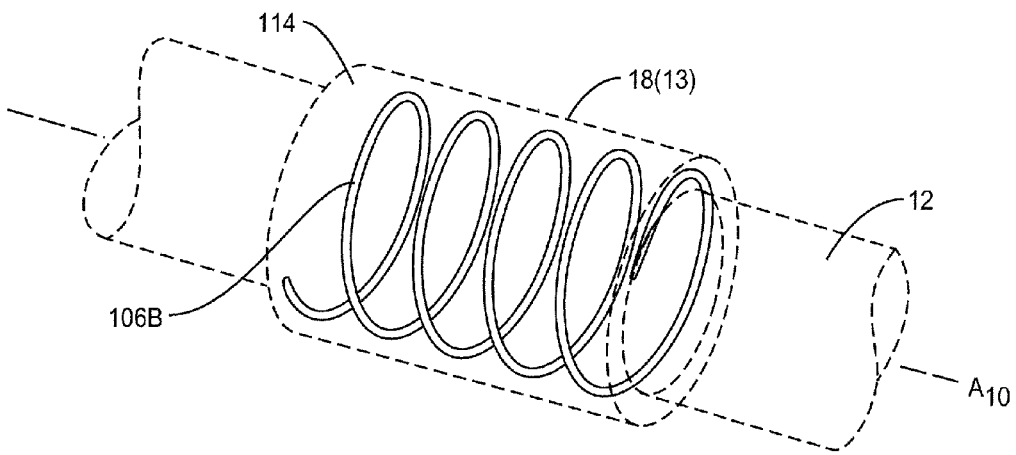

Other examples of expansion joints are possible. FIGS. 21A-21C are a perspective view, a partial cutaway perspective view and a full cutaway view, respectively, of an exemplary expansion joint 18(13) installed upon the pipe 12. The expansion joint 18(13) comprises a foam expansion body 114 and a helical spring 106B disposed within the foam expansion body 114. The foam expansion body 114 may be structurally similar to the expansion joints 18(1)-18(12) discussed earlier, and accordingly only differences will be discussed for clarity and conciseness. As shown in FIG. 21A, the expansion joint 18(13) may appear similar to the expansion joints 18(1)-18(12) as only the foam expansion body 114 is observable from the outside. As depicted in the partial cutaway view of FIG. 21B, the foam expansion body 114 of the expansion joint 18(13) may comprise the outer channels 42 and the inner channels 44. The foam expansion body 114 may also optionally include the inner passageways 46 (not shown in FIG. 21B). The helical spring 106B may be disposed within the foam expansion body 114 of the expansion joint 18(13). For example, the helical spring 106B may be disposed within the outer channels 42, the inner channels 44, or within the inner passageway 46. Accordingly as the foam expansion body 114 is placed in compression or tension parallel to the center axis A10 by the change in the gap 21 between the insulation members 16(1), 16(2) shown in FIG. 2A. The helical spring 106B will also correspondingly be placed in compression or tension parallel to the center axis A10. In this manner, the helical spring 106B provides resiliency to the expansion joint 18(13) so that the end surfaces 29(1), 29(2) of the expansion joint 18(13) may better push against the insulation members 16(1), 16(2) shown in FIG. 2A, to ensure that the gap 21 (FIG. 2A) is fully insulated.

Now that various embodiments of the expansion joints 18(1)-18(13) have been introduced, an insulation wrap 116(1) is now discussed using similar concepts. As used herein, the term "insulation wrap" may be different from the expansion joint in that the insulation wrap may or may not be disposed between the insulation members 16(1), 16(2) as shown in FIG. 2A.

Figure 22A:
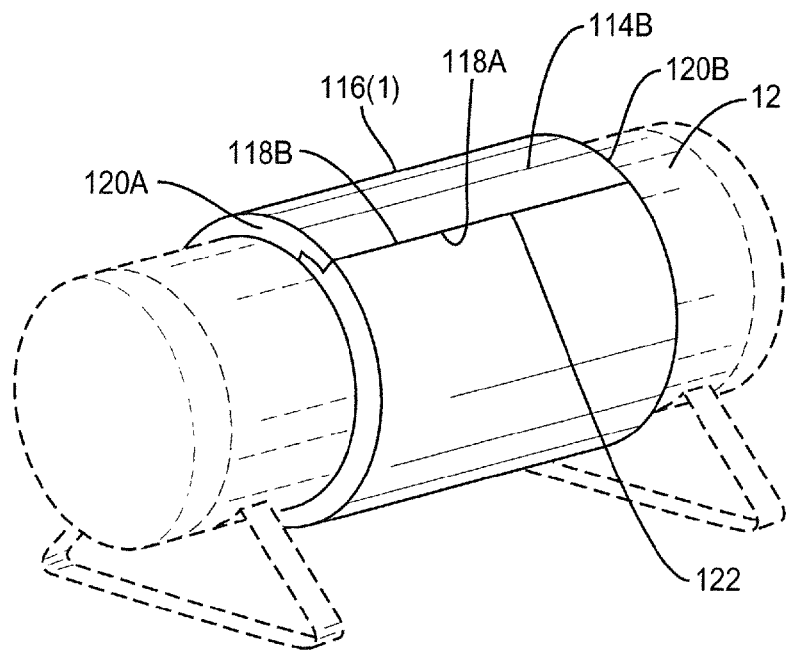
FIGS. 22A and 22B depict a perspective view of a substantially non-expandable insulation wrap as known in the art disposed around the elongated container at a datum ambient temperature and at a reduced temperature, respectively, showing a longitudinal fastener failing at the reduced temperature.
Figure 22B:
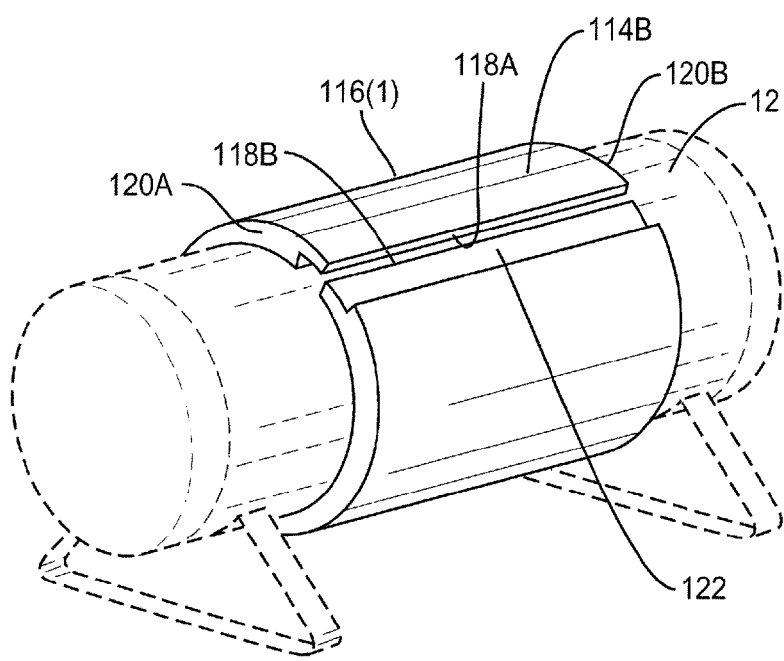

In this regard, FIGS. 22A and 22B depict a perspective view of the insulation wrap 116(1) about the elongated container 12 at a datum ambient temperature. The insulation wrap 116(1) comprises a foam body 114B, which may extend from a first longitudinal side 118A to a second longitudinal side 118B opposite the first longitudinal side 118A. The foam body 114B also extends from a first latitudinal side 120A to a second latitudinal side 120B opposite the first latitudinal side 120A. As shown in FIG. 22A, the insulation wrap 116(1) may also comprise at least one longitudinal fastener 122 configured to fasten the first longitudinal side 118A proximate to the second longitudinal side 118B to secure the thermoplastic profile in a shape or substantially the shape of the elongated container 12. The longitudinal fastener 122 may comprise a rabbet 123 to better provide a more secure interface between the first longitudinal side 118A proximate to the second longitudinal side 118B.

FIG. 22B is a perspective view of the insulation wrap 116(1) of FIG. 22A at a reduced temperature less than the datum ambient temperature, wherein the longitudinal fastener 122 has failed. The reduced temperature may occur because the elongated container 12 became colder or the ambient temperature became colder than the datum ambient temperature. The insulation wrap 116(1) shrinks as its temperature decreases according to its thermal expansion coefficient, thereby causing increased stress at the longitudinal fastener 122. The increased stress may cause the longitudinal fastener 122 to fail to keep the first longitudinal side 118A and the second longitudinal side 118B proximate to each other. In this manner, the insulation wrap 116(1) may fall off the elongated container 12 and/or may provide less efficient insulating properties to the elongated container 12.

Figure 23A:
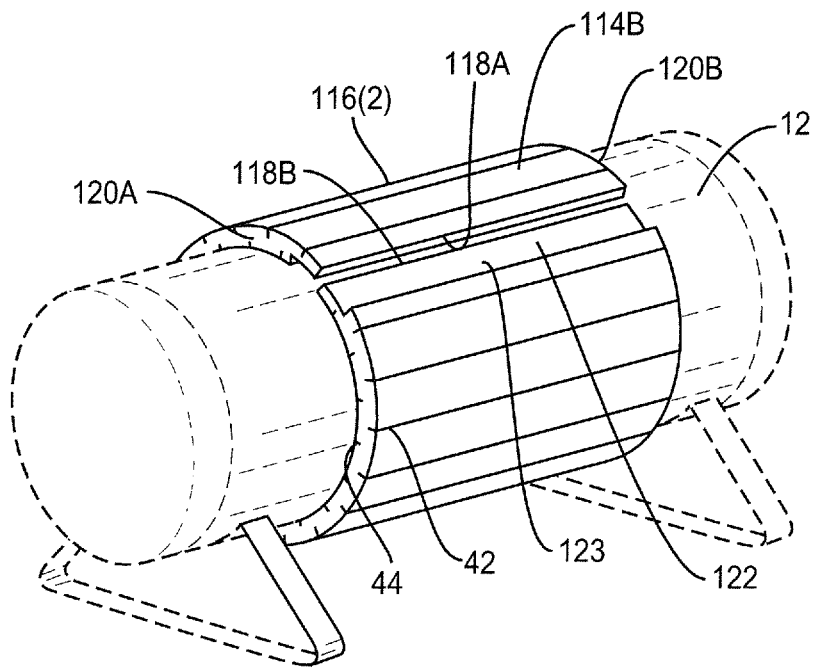
FIGS. 23A and 23B depict perspective views of an example of an expandable insulation wrap being disposed around the elongated container during installation at a datum temperature, and when the expandable insulation wrap is expanded to complete the installation, respectively.
Figure 23B:
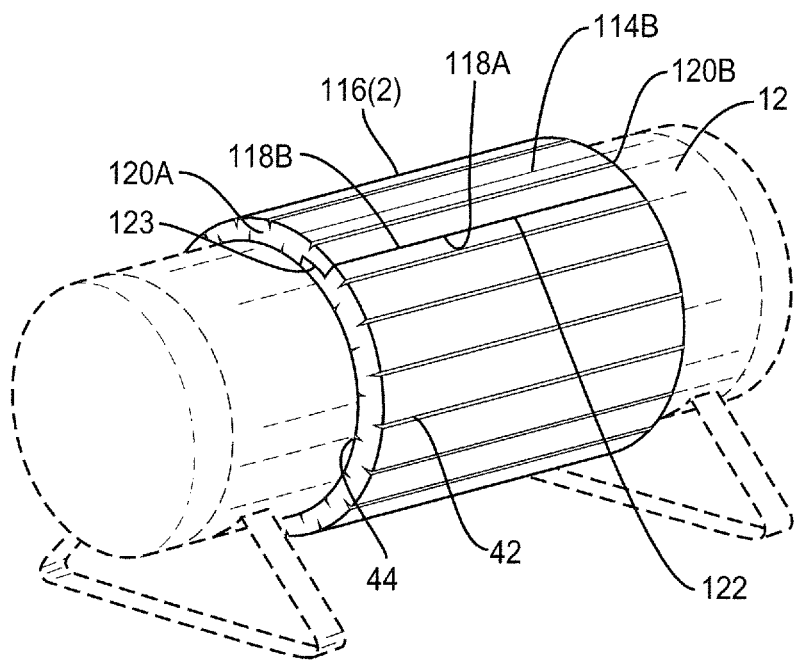

To improve the insulation wrap 116(1), FIGS. 23A-23B depict perspective views of another example of an insulation wrap 116(2) disposed around the elongated container 12. As shown in FIG. 23A, the insulation wrap 116(2) may be placed under tension so that the longitudinal fastener 122 may keep the first longitudinal side 118A proximate to the second longitudinal side 118B. The insulation wrap 116(2) is similar to the insulation wrap 116(1), and so only differences will be discussed for clarity and conciseness. The insulation wrap 116(2) comprises the at least one outer channel 42 and the at least one inner channel 44 extending from the first latitudinal side 120A to the second latitudinal side 120B. In this manner, the outer channels 42 and the inner channels 44 are configured to change shape, as shown in FIG. 23B, to allow the foam body 114B to better expand to relieve the stress on the longitudinal fastener 122 and thereby keep the first longitudinal side 118A proximate to the second longitudinal side 118B during temperature fluctuations.

Furthermore, each of the inner channels 44 may be staggered around the circumference of the elongated container 12 as shown in FIGS. 23A-23B, with respect to a respective nearest one of the at least one outer channel 42. In this way, the outer channels 42 and the inner channels 44 may be deeper within the foam body 114B, and the insulation wrap 116(2) may more easily expand along the circumferential direction of the elongated container 12 to relieve strain on the longitudinal fastener 122. Accordingly, the longitudinal fastener 122 is less likely to fail during temperature fluctuations, and the first longitudinal side 118A will be kept proximate to the second longitudinal side 118B during temperature fluctuations.

Figure 24A:
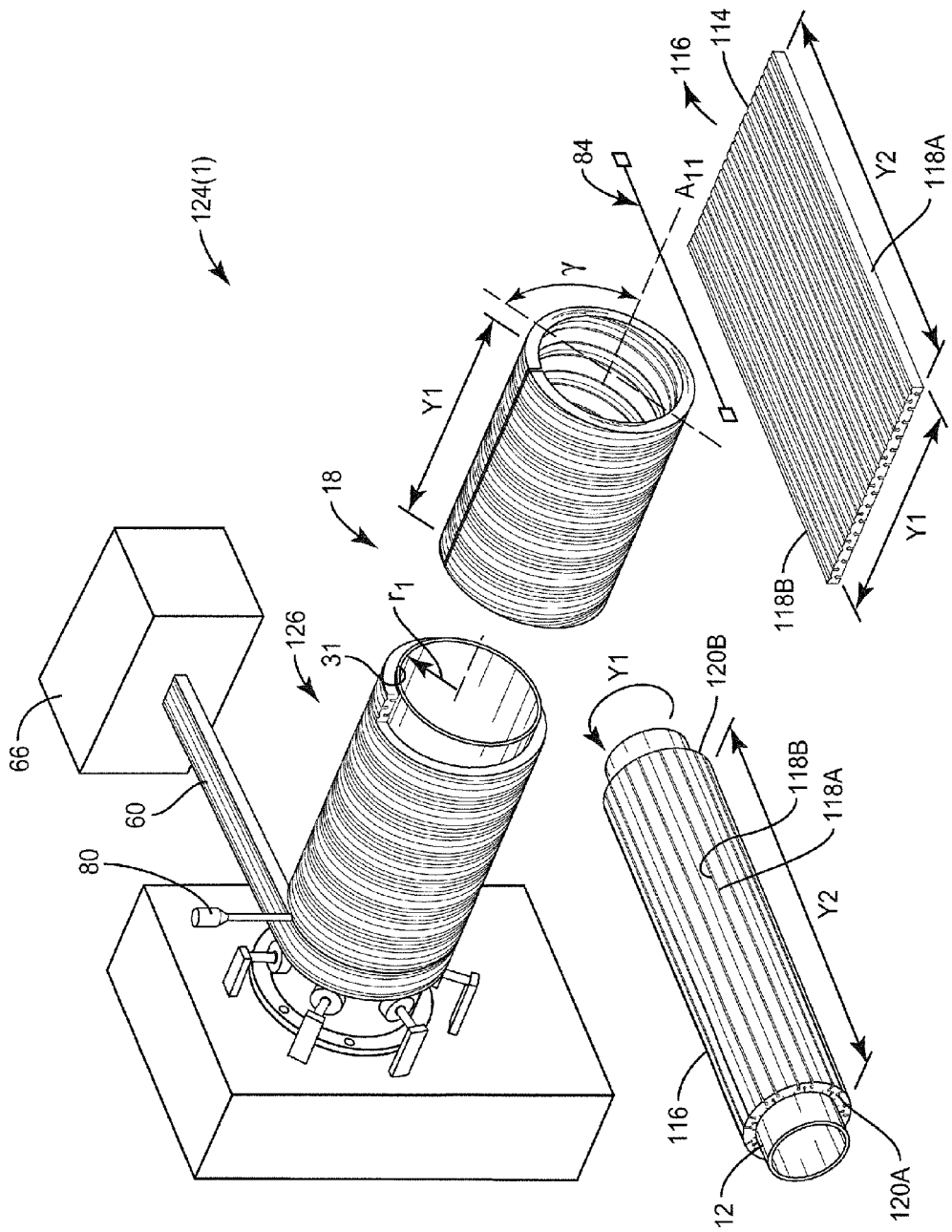
FIGS. 24A and 24B depict exemplary processes for creating the expandable insulation wrap.

An exemplary process 124(1) for creating the insulation wrap 116(2) is depicted graphically in FIG. 24A, similar in some ways to the exemplary process (FIG. 8) to make the expansion joints 18(1)-18(13). The process 124(1) comprises extruding the at least one foam profile 60 through the extruder 66. The extruding may comprise forming the at least one outer channel 42 and the at least one inner channel 44 as part of the foam profile 60. The process 124(1) further comprises positioning the at least one foam profile 60 each with a helix shape 126 configured to be disposed around the elongated container 12. The helical shape 126 may be positioned about the center axis $A_{11}$ and the internal surface 31 of the at least one foam profile 60 are disposed a common distance $r_1$ from the center axis $A_{11}$. The process 124(1) may also include thermally bonding with the bonding fusion head 80 the plurality of convolutions of the helix shape 126, as discussed above. In this manner, the foam expansion body 114 may be formed.

The process 124(1) further comprises cutting the at least one foam profile 60 at an angle gamma (γ) to the center axis $A_{11}$ with the cutting system 84 to form the first longitudinal side 118A and the second longitudinal side 118B of the insulation wrap 116. The angle gamma (γ) may be, for example, ninety (90) degrees. The process 124(1) further comprises cutting the at least one foam profile 60 to form the first latitudinal side 120A and the second latitudinal side 120B of the insulation wrap 116. In this manner, the insulation wrap 116 may fit upon the elongated container 12.

Figure 24B:
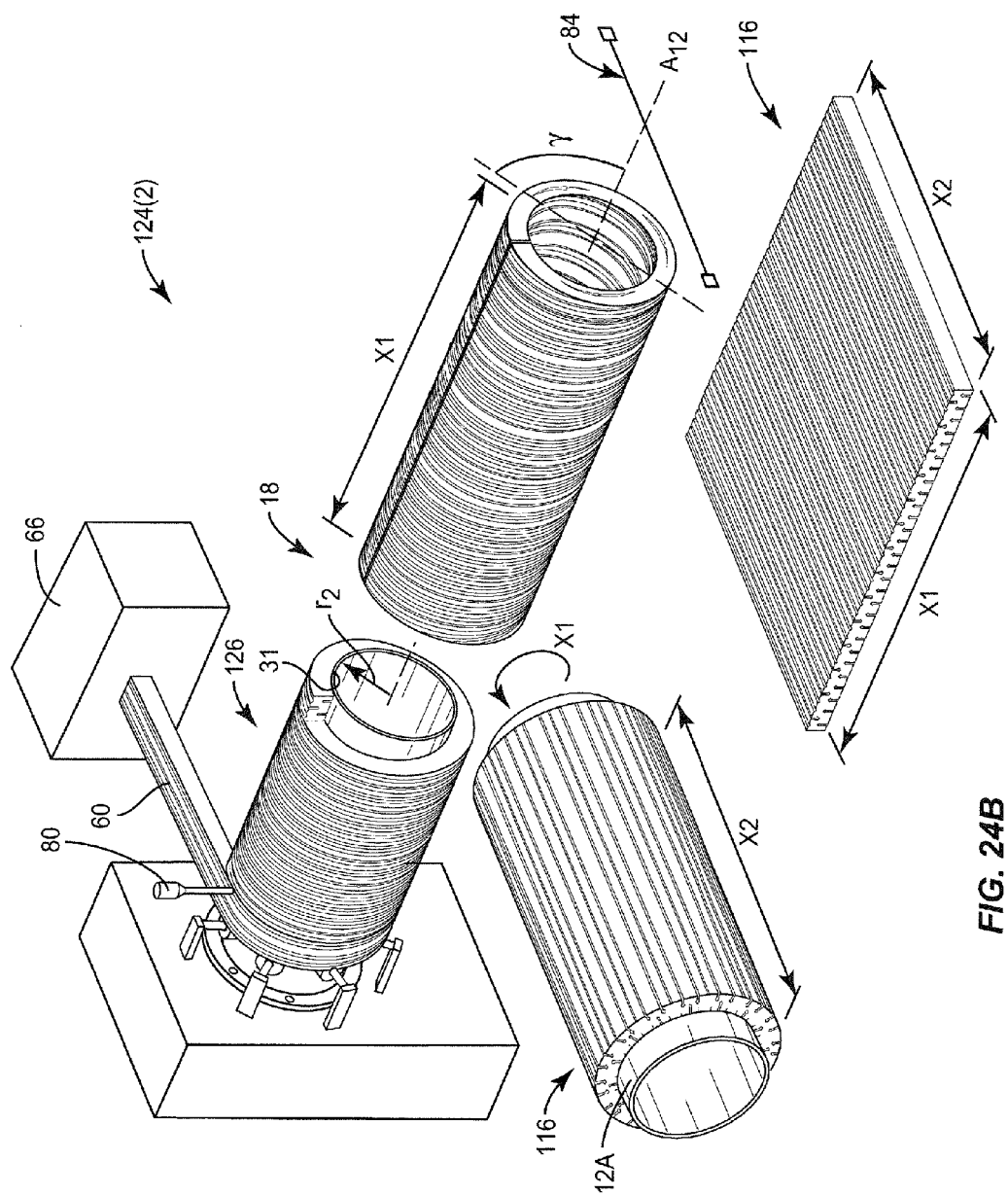

FIG. 24B depicts a similar process to FIG. 24A for creating the insulation wrap 116, and so only differences will be discussed for clarity and conciseness. In the process 124(2), the helical shape 126 may be positioned about the center axis $A_{12}$, and the internal surface 31 of the at least one foam profile 60 is disposed a common distance $r_2$ from the center axis $A_{12}$. The common distance $r_2$ may be longer than the common distance $r_1$ to create the first longitudinal side 118A and the second longitudinal side 118B of length $X_2$, which may be longer than the comparable length $Y_2$ in FIG. 24A. Further, the foam profile 60 may be cut a longer length $X_1$ by the cutting system 84 in the process 124(2) to be mounted on an elongated container 12A having a larger diameter than the elongated container 12 in the process 124(1). In this manner, the insulation wraps 116 of different sizes may be created.

Many modifications and other variations of the embodiments disclosed herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An insulation system for an exterior of an elongated container, comprising:

a foam expansion joint configured to be disposed around an elongated container, extending in a longitudinal direction, the foam expansion joint having a latitudinal dimension extending from a first longitudinal side to a second longitudinal side opposite the first longitudinal side, and the foam expansion joint having a longitudinal dimension extending from a first latitudinal side to a second latitudinal side opposite the first latitudinal side;

at least one channel extending from the first longitudinal side to the second longitudinal side; and at least one longitudinal fastener configured to fasten the first longitudinal side proximate to the second longitudinal side to secure the foam expansion joint in a shape or substantially the shape of a cross-sectional perimeter of the elongated container such that the longitudinal dimension of the expansion joint is substantially parallel to the longitudinal direction of the elongated container, wherein the at least one channel is configured to change shape to allow the longitudinal dimension of the foam expansion joint to change and thereby enable the first latitudinal side of the foam expansion joint to abut against a first insulation member extending in the longitudinal direction and the second latitudinal side of the foam expansion joint to abut against a second insulation member extending in the longitudinal direction as a thermally-sensitive distance changes between the first insulation member and the second insulation member.

2. The insulation system of claim 1, wherein the foam expansion joint is configured to be disposed on a spool prior to installation.

3. The insulation system of claim 1, wherein at least one of the first latitudinal side and the second latitudinal side includes a rabbet configured to form an overlapping joint with at least one of the first insulation member and the second insulation member.

4. The insulation system of claim 1, wherein at the foam expansion joint comprises puncturing holes therein.

5. The insulation system of claim 1, further comprising at least one second channel extending from the first latitudinal side to the second latitudinal side.

6. The insulation system of claim 1, wherein the at least one channel being configured to reversibly expand when the thermally-sensitive distance increases when the foam expansion joint is pulled by the at least one longitudinal fastener to the first insulation member and the second insulation member.

7. The insulation system of claim 6, wherein the foam expansion joint is configured to be under a tension applied to the first latitudinal side and the second latitudinal side while installed upon the elongated container.

8. The insulation system of claim 1, wherein the foam expansion joint is comprised of at least one foam profile each having a helix shape around a center axis and each of the at least one foam profile having an inner surface equidistant from the center axis.

9. The insulation system of claim 8, wherein the at least one foam profile comprises a thermoplastic foam profile, and a thermoset foam profile at least partially disposed within the thermoplastic foam profile.

10. The insulation system of claim 1, wherein the at least one channel comprises at least one outer channel formed by an outer surface of the foam expansion joint and at least one inner channel formed by an inner surface of the foam expansion joint.

11. The insulation system of claim 10, wherein the foam expansion joint comprises at least one inner passageway parallel to the at least one channel.

12. The insulation system of claim 10, wherein the inner surface and the outer surface are concentric or substantially concentric.

13. The insulation system of claim 10, wherein the each of the at least one inner channel being staggered longitudinally with respect to a respective nearest one of the at least one outer channel.

14. The insulation system of claim 1, wherein the foam expansion joint is comprised of thermoplastic.

15. The insulation system of claim 14, further comprising at least one metal spring disposed at least partially within the foam expansion joint.

16. The insulation system of claim 14, further comprising at least one metal spring disposed within at least one of the at least one channel.

17. An insulation system for an exterior of an elongated container, comprising:

a foam expansion joint having a latitudinal dimension extending from a first longitudinal side to a second longitudinal side opposite the first longitudinal side, and the foam expansion joint having a longitudinal dimension extending from a first latitudinal side to a second latitudinal side opposite the first latitudinal side, wherein the foam expansion joint is formed of at least two foam profiles, the at least two foam profiles comprising a first foam profile and a second foam profile, and two of the at least two foam profiles having different longitudinal cross-sections; and at least one longitudinal fastener configured to fasten the first longitudinal side proximate to the second longitudinal side to secure a foam profile in a shape or substantially the shape of the elongated container such that the longitudinal dimension of the expansion joint is substantially parallel to the longitudinal direction of the elongated container, wherein at least one of the different cross-sections is configured to change shape to allow the longitudinal dimension of the foam expansion joint to change and thereby enable the first latitudinal side of the foam expansion joint to abut against a first insulation member extending in the longitudinal direction and the second latitudinal side of the foam expansion joint to abut against a second insulation member extending in the longitudinal direction as a thermally-sensitive distance changes between the first insulation member and the second insulation member.

18. The insulation system of claim 17, wherein the first foam profile comprises at least one channel.

19. The insulation system of claim 17, wherein the first foam profile comprises at least one inner passageway.

20. The insulation system of claim 17, wherein the first foam profile is comprised of thermoplastic and the second foam profile is comprised of thermoset.

21. The insulation system of claim 17, further comprising at least one metal spring disposed at least partially within one of the first foam profile and the second foam profile.

22. The insulation system of claim 17, wherein the at least two foam profiles each includes a helix shape around a center axis and each having an inner surface equidistant or substantially equidistant from the center axis.

23. The insulation system of claim 22, wherein the first foam profile is at least partially disposed within the second foam profile.

24. The insulation system of claim 23, wherein the first foam profile comprises puncturing holes therein.

25. An insulation system for an exterior of an elongated container, comprising:

a foam expansion joint having a latitudinal dimension extending from a first longitudinal side to a second longitudinal side opposite the first longitudinal side, and the foam expansion joint having a longitudinal dimension extending from a first latitudinal side to a second latitudinal side opposite the first latitudinal side, wherein the foam expansion joint is formed or substantially formed of at least one foam profile in a helix shape having an axis extending in an axial direction and a pitch dimension defined by a distance between the first latitudinal side and the second latitudinal side in the axial direction; and at least one longitudinal fastener configured to fasten the first longitudinal side proximate to the second longitudinal side to secure the foam profile in a shape or substantially the shape of an elongated container extending in the axial direction, wherein the first latitudinal side of the foam expansion joint is configured to abut against a first insulation member extending in the axial direction and the second latitudinal side of the foam expansion joint is configured to abut against a second insulation member extending in the longitudinal direction as a thermally-sensitive distance changes between the first insulation member and the second insulation member.

26. The insulation system of claim 25, wherein at least one of the at least one foam profile comprises at least one channel.

27. The insulation system of claim 25, wherein at least one of the at least one foam profile comprises at least one inner passageway.

28. The insulation system of claim 25, wherein the at least one foam profile comprises a first foam profile and a second foam profile, and the first foam profile is comprised of thermoplastic and the second foam profile is comprised of thermoset.

29. The insulation system of claim 25, further comprising at least one metal spring disposed at least partially within the foam expansion joint.

30. A method of creating an insulation system for an exterior of an elongated container, comprising:

extruding at least one foam profile through an extruder;

positioning each of the at least one foam profile in a helix shape to form a foam body, such that each helix shape is positioned along a center axis and is configured to be disposed around an elongated container extending in an axial direction such that the center axis of the foam body is substantially parallel to the axial direction;

cutting the foam body at an angle to the center axis to form a first latitudinal side and a second latitudinal side of a foam expansion joint; and cutting the foam body substantially parallel to the center axis to form a first longitudinal side and a second longitudinal side of the foam expansion joint configured to allow the foam body to be disposed around the elongate container.

31. The method of claim 30, wherein the extruding comprises forming at least one inner passageway of the at least one foam profile.

32. The method of claim 30, wherein the positioning the at least one foam profile comprises positioning the helices of a plurality of foam profiles of the at least one foam profile so that the helices being positioned about the center axis and an internal surface of the plurality of foam profiles and are disposed at a common distance from the center axis.

33. The method of claim 32, wherein the extruding includes extruding one of the plurality of foam profiles to be comprised of thermoplastic and extruding another of the plurality of foam profiles to be comprised of thermoset.

34. The method of claim 30, wherein the extruding comprises forming at least one inner channel of the at least one foam profile and forming at least one outer channel of the at least one foam profile.

35. The method of claim 34, wherein the extruding comprises forming the at least one inner channel of the at least one foam profile staggered longitudinally from a nearest one of the at least one inner channel.

36. The method of claim 35, further comprising compressing the at least one helix shape of the at least one foam profile with a compression force parallel to the center axis to form a compressed shape to close or substantially close all of the at least one inner channel and the at least one outer channel.

37. The method of claim 36, further comprising heating the compressed shape of the at least one foam profile to an elevated temperature, and then cooling the at least one foam profile to an ambient temperature before removing the compression force so that the at least one foam profile remains in the compressed shape.

\* \* \* \* \*